United States Patent
August et al.

(10) Patent No.: US 6,647,383 B1
(45) Date of Patent: Nov. 11, 2003

(54) SYSTEM AND METHOD FOR PROVIDING INTERACTIVE DIALOGUE AND ITERATIVE SEARCH FUNCTIONS TO FIND INFORMATION

(75) Inventors: Katherine G. August, Matawan, NJ (US); Chin-Sheng Chuang, Holmdel, NJ (US); Michelle McNerney, Freehold, NJ (US); Elizabeth A. Shriver, Jersey City, NJ (US); Mark Hansen, Summit, NJ (US); Ping-wen Ong, Middletown, NJ (US); Daniel D. Lee, Hoboken, NJ (US); Craig Nohl, Middletown, NJ (US); Theodore Sizer, II, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 94 days.

(21) Appl. No.: 09/654,335

(22) Filed: Sep. 1, 2000

(51) Int. Cl.⁷ .............................................. G06F 17/30
(52) U.S. Cl. ........................................................ 707/3
(58) Field of Search ........................ 707/2, 3, 4, 5, 707/6, 10, 505; 345/428, 966; 704/9; 705/1; 706/12

(56) References Cited

U.S. PATENT DOCUMENTS

| | | | | |
|---|---|---|---|---|
| 5,331,556 A | * | 7/1994 | Black et al. .................... | 704/9 |
| 6,112,181 A | * | 8/2000 | Shear et al. .................... | 705/1 |
| 6,154,213 A | * | 11/2000 | Rennison et al. ........... | 345/428 |
| 6,169,986 B1 | * | 1/2001 | Bowman et al. .............. | 707/10 |
| 6,199,099 B1 | * | 3/2001 | Gershman et al. .......... | 345/966 |
| 6,233,575 B1 | * | 5/2001 | Agrawal et al. .............. | 706/12 |

OTHER PUBLICATIONS

Kit G. August et al., *An Introduction to Future Communications Services and Access*, Bell Labs Technical Journal, vol. 4, No. 2, Apr.–Jun. 1999, pp. 3–20, Published Sep. 3, 1999.

* cited by examiner

Primary Examiner—Diane D. Mizrahi
Assistant Examiner—Apu M. Mofiz

(57) ABSTRACT

A system and method for information searching comprising determination of, in fine granularity, a Community of Interest (COI), further data mining in search results, using at least one of COI and expert preferences to identify important knowledge, formulation and manipulation of results, and summarization of search results into a document like entity with dynamic attributes described. More particularly, the invention relates to a system and method for providing interactive dialogue and iterative search functions to find information on a large network of servers such as the world wide web.

20 Claims, 14 Drawing Sheets

SEARCH RETURNS LARGE NUMBER (THRESHOLD SET) ELEMENTS

FIG. 8

210
PROFESSIONS

| 101 | DEFINITION | LEXICAL 1 | DISTINCTION 5 | DEMOGRAPHIC | ... |
| 102 | DEFINITION | LEXICAL 2 | DISTINCTION 6 | DEMOGRAPHIC | ... |
| 103 | DEFINITION | LEXICAL 5 | DISTINCTION 1 | DEMOGRAPHIC | ... |
| 104 | DEFINITION | | | DEMOGRAPHIC | ... |
| 105 | DEFINITION | | | | ... |
| 106 | DEFINITION | | | | ... |

212    214    216    218    220

230
LEXICAL 1 ELECTRICAL ENGINEERING

| TERM X - DEFINITION | ... |
| TERM Y - DEFINITION | ... |
| TERM Z - DEFINITION | ... |

232    234

240
DISPLAY TECHNIQUES

| 4 | CHART A | TABLE B | ... |
| 5 | CHART A | TABLE C | ... |
| 6 | CHART B | TABLE A | ... |

242    244    246

250
LEXICAL 2 ARCHITECTURE

| TERM X - DEFINITION | ... |
| TERM Y - DEFINITION | ... |
| TERM Z - DEFINITION | ... |

252    254

SYSTEM AND METHOD FOR PROVIDING INTERACTIVE DIALOGUE AND ITERATIVE SEARCH FUNCTIONS TO FIND INFORMATION

FIELD OF THE INVENTION

This invention relates to a system and method for providing interactive dialogue and iterative search functions to find information among a network of servers and to display results depicting overall distribution and relationship of results.

BACKGROUND OF THE INVENTION

While many search engines currently exist, it would nonetheless be advantageous to combine techniques known by subject-matter experts who manage queries manually and apply known data management techniques to develop an improved search engine. An arena where these opportunities are particularly evident is the world wide web where one of the most popular applications is a web search engine. Many search engines are available but provide similar and limited functionality.

A problem with the currently available search engines is that they fail to provide effective results for many search problems. The failures fall into a number of categories including, but not limited to, 1) formulating a query, 2) adequately displaying, manipulating and navigating through results, 3) determining for what the user is actually looking, and 4) remembering how to locate the results again. From the point of view of web site owners, search engines have another set of shortcomings including, but not limited to 1) failure of metatags to provide sufficient information for an intelligent search approach, 2) failure of key words to formulate an intelligent search, and 3) the inherent requirement that web site owners maintain a large number of tags in inventory because of the ambiguity of language. Additionally, there exist some technical entities that can be improved upon in the course of a search. For example, it would be advantageous if redundant results could be eliminated, dead ends could be eliminated, and sources could be evaluated, tagged and screened. It would also be advantageous to provide search functions that correspond with known communities of users (or websites, etc.).

Search results, as they are presented today, are not obvious to users. Also, the results are not presented in such a fashion as to take advantage of the human's ability to sift through data visually and to determine relationships among displayed objects. Most systems do not disambiguate search terminology well enough to determine what the user meant when typing a query. Typically, users do not have to perform many steps to initiate a search task; they will usually enter a few key words and then request a search. As such, there is a need to combine iterative configurable query techniques with a lexical dictionary function. This combination is currently not available in search engines.

Web search engines do not provide user access to restructure aspects of the search from a graphical user interface. When a search is conducted and results are displayed, the decisions of the search engine are not displayed such that the user can manipulate the branches and navigate down the decision and results tree, changing the attributes and thereby finding slightly different results. The user is not provided with any information on what the extent of the results may be. The user is not afforded any opportunity to reconfigure the search or the results to display the relationship among the items returned.

Some search engines provide policies that attempt to order search results based upon closeness to the query and provide metrics to the user indicating closeness. Metrics are based upon popularity, word frequency, word relationships, position of word in title or body, metatags, links within a web site, links to a page or web site, physical attributes of the web site, etc.

Further, in all known search engines, accurate prediction relies heavily upon the ability to analyze large amounts of data. This task is extremely difficult because of the sheer quantity of data involved and the complexity of the analyses that must be performed. The problem is exacerbated by the fact that the data often resides in multiple databases, each database having different internal file structures. Rarely is the relevant information explicitly stored in the databases. Rather, the important information exists only in the hidden relationships among items in the databases. Recently, artificial intelligence techniques have been employed to assist users in discovering these relationships and, in some cases, in automatically discovering the relationships.

Data mining is a process that uses specific techniques to find patterns in data, allowing a user to conduct a relatively broad search of large databases for relevant information that may not be explicitly stored in the databases. Typically, a user initially specifies a search phrase or strategy and the system then extracts patterns and relations corresponding to that strategy from the stored data. These extracted patterns and relations can be: (1) used by the user, or data analyst, to form a prediction model; (2) used to refine an existing model; and/or (3) organized into a summary of the target database. Such a search system permits searching across multiple databases.

There are two existing forms of data mining: top-down and bottom-up. Both forms are separately available on existing systems. Top-down systems are also referred to as "pattern validation," "verification-driven data mining" and "confirmatory analysis." This is a type of analysis that allows an analyst to express a piece of knowledge, validate or validate that knowledge, and obtain the reasons for the validation or invalidation. The validation step in a top-down analysis requires that data refuting the knowledge as well as data supporting the knowledge be considered. Bottom-up systems are also referred to as "data exploration." Bottom-up systems discover knowledge, generally in the form of patterns, in data.

Existing systems rely on the specific interface associated with each database, which further limits a user's ability to dynamically interact with the system to create sets of rules and hypotheses than can be applied across several databases, each having separate structures. For large data problems, a single interface and single data mining technique significantly inhibits a user's ability to identify all appropriate patterns and relations. The goal of performing such data mining is to generate a reliable predictive model that can be applied to data sets. Furthermore, existing systems require the user to collect and appropriately configure the relevant data, frequently from multiple and diverse data sources. Little or no guidance or support for this task is produced.

There is also a system that permits a user to create a reliable predictive model using data mining across multiple and diverse databases.

There is a need to help the user collect the data from a number of servers, process the data to reveal the explicit and non-explicit information, manipulate the information, use it to refine a search, extract original documents, reformulate a query, and modify a component or policy of a query. This should be done within the knowledge base or personality of the user in mind, with text and graphical elements most likely to represent a model used by the Community of Interest the user is from, such as an investor. This should also be done in a manner so as to allow the user to borrow the knowledge of another experienced Community of Interest or expert in a given field. This should be done with or without sharing identity of the user.

The results of the search should also be organized into a summary document to reveal the predictive model, sources, salient facts of the result, and links to resulting elements. This would help create content of a document about the subject search.

The results of the search should also be organized into groups, where all of the items in a group discuss similar topics. The grouping can be using information in the item (e.g., key words), or by how the item has been used in the past. The grouping can be done a number of ways; additional details will be discussed in the "Summary of the Invention" section.

Improvements in information search engines to eliminate or reduce the aforementioned difficulties, and to satisfy the aforementioned needs, are desired. As such, the present invention contemplates a new and improved system and method for providing interactive dialogue and iterative search functions to find information among a network of servers and to display results depicting overall distribution and relationship of results.

Many of the inputs suggested in this patent depend on either explicitly requested user data or passively accumulated user-level information on searching habits. We acknowledge the possible privacy implications of this but do not directly address these issues in this patent.

SUMMARY OF THE INVENTION

A system and method for providing interactive dialogue and iterative search functions to find information among a network of servers and to display results depicting overall distribution and relationship of results are provided. The system and method provide determination in fine granularity a Community of Interest (COI) and further evaluation of search results using COI and/or expert preferences to identify important knowledge, formulate, manipulate, and display results, and summarize search results into a document like entity with dynamic attributes. The invention is generally applicable to an information search on a large network of servers such as the world wide web where there is such a vast amount of information that it is becoming increasingly important to overcome the aforementioned difficulties in order to effectively deal with the overwhelming amount of data that a search engine might return on any given search.

A primary advantage of the present invention is the pre-processing function that clarifies the query intent of the search engine user before initiating a search.

Another advantage of the present invention is the disambiguation of text by the use of lexical indexes, expert databases and known mental models for subject-specific and area-specific data whereby query results can be characterized based upon target user knowledge.

Still another advantage of the present invention is the multi-layered approach to presenting results, only showing the most likely solutions in a high level display, and showing more detail as lower levels are telescoped into.

Yet another advantage of the present invention is the use of new concepts in graphically presenting search results including such things as scatter grams, showing relationships among resulting elements, and the use of color, shape and other attributes to differentiate among resulting elements.

Another advantage of the present invention is the determining of COI categories in fine granularity, representing COI categories and representing them differently for different COI's, representing relationships among COI categories and identifying an individual and the COI or COI's to which he or she belongs.

Another advantage of the present invention is the handling of shifting or dynamic elements over time (resources and sources, access, individual's experiences and skill set, age, preferences) by creating an expert record, modifying taxonomy over time to reflect changes in individual or group usage, time or society structures within which an individual operates (company, school, group).

Another advantage of the present invention is the provision of a system of graphic and audio representations of data that assist in understanding (for different populations and skill sets).

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 8 is an illustration of an exemplary organization of a Community of Interest Database;

DETAILED DESCRIPTION OF THE PREFERRED EMBODIMENTS

Figure 1:
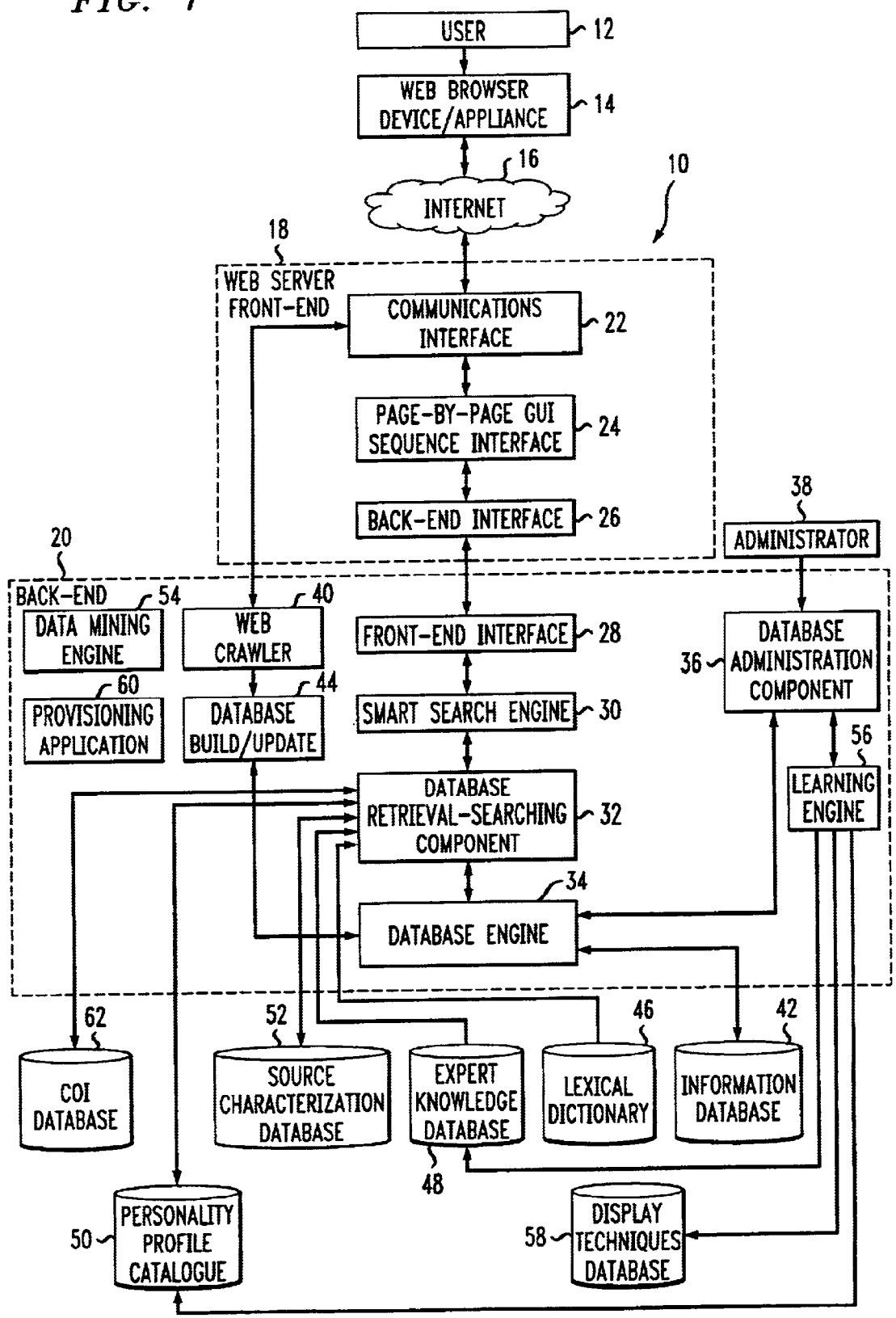
FIG. 1 is an exemplary network configuration incorporating an embodiment of the present invention as it relates to the world wide web.

The present invention has a number of enhancements or policies above and beyond the traditional search function. The general purpose of these policies is to understand the general needs of the user when conducting a search, to narrow retrieved items to logical subgroups, to present the results in a format that can be manipulated and understood by the specific user given a Community of Interest, or COI, age, background, etc., and to retain evidence of searches through learning about the individual's preferences, Communities of Interest, and history. The system has the ability to formulate a personality for a person based on COI and learning. Or, a person can administer a personality to represent a customer group, user group, constrained group, etc.

COI (Community of Interest) is a policy that yields improved search results. For example, a method has been disclosed in co-pending and pending application Ser. No. 09/428,031, by Shriver and Small, filed Oct. 27, 1999, entitled METHOD FOR IMPROVING WEB SEARCHING PERFORMANCE USING COMMUNITY-BASED FILTERING, hereby incorporated by reference.

That disclosure notes that often, members of a community (an office, lab, or social organization) think about and research the same set of topics. When searching for information on the web or other electronic database, if others from one's community have recently performed the same searches, it would be helpful to know which of the results of such searches were found useful. For example, if a specific search was done by someone in the community, and after that search, a number of web pages were visited and explored, then information about that search should be useful to highlight the best page or pages from that search to another user from the same community who enters the same search.

In a preferred embodiment of the Shriver and Small method, data is gathered from the searches of members of a community. This data is analyzed to determine which searches have been performed, and what users did with the results obtained from the searches. Once this information has been gathered, it can be presented when the same search is performed by someone in the community.

Several methods may be used to gather the information from the searches of members of the community. In a preferred embodiment, this information gathering is done by means of examining proxy server logs. A proxy server is a server that takes requests of users and passes them to a web server, which sends requests and receives data. The web server then sends requested data to the proxy server, which transmits it back to the user.

In an alternate embodiment of the Shriver and Small method, information from the proxy server may also be examined on a real-time basis. In yet another alternate embodiment for systems without a proxy server, individual web server logs, if they exist, may be examined. These server logs contain data about the requests which have been made by users for web pages.

Search queries which have been made by members of the community can be identified by examining the proxy server log for accesses which have been sent to search engine cites. For example, the proxy server log could be searched for search queries directed at the Alta Vista, Excite, Google, HotBot. Infoseek. Lycos, Northern Light, and Yahoo search engines.

In a preferred embodiment of the Shriver and Small method, first the proxy server log is examined and a list of URLs visited by the user is created, ordered in temporal order. Next, the list of URLs visited is stepped through to find a search sent to a search engine. Such a search will either be found or not. If no search is found, a list of URLs visited is created for the next user. If a search is found on the list of URLs visited, the search will be replicated by sending the query to the search engine. The results of that search are used to create a list of accessible URLs—any pages shown as a result of that search will be placed on the list. Then, provided that there are more URLs on the list of URLs visited by the user in temporal order, the next URL on the list will be examined. (If there are no more URLs on that list, then the process repeats for the next user). If there is another URL on the list of URLs visited, then that URL is examined, and if that URL is on the list of accessible URLs, then that URL is visited and the links on the page visited are added to the list of URLs, after which the examination of the user's list of URLs visited in order is continued. On the other hand, if the next URL was not on the list of accessible URLs, that indicates that the user has ended the search session, and the rest of the URLs visited in order is examined to find the next search.

In this way, each user's search activity is examined. The search session is considered active while the user is accessing pages retrieved from the search page, either directly or indirectly. A direct access from the search page is that access of a page listed in the search results; an indirect access is when the page is accessed from links appearing on a page which was either listed on the search page (a directly accessed page) or from links appearing on a page which was indirectly accessed. In other words, pages found on the list of accessible URLs which are then accessed are considered directly accessed, and pages added to the list of accessible URLs which are then accessed are considered indirectly accessed.

In another embodiment of the Shriver and Small method, several different searches may be considered active at one time. This can be useful because users may occasionally run more than one search at a time in different browser windows. In order to do this, a list of accessible URLs is maintained for each search, and instead of maintaining only one list of accessible URLs and comparing URLs on the users' list of URLs visited in temporal order with URLs in that list, several different lists of accessible URLs, each corresponding to a search performed by the user, are maintained.

In the alternate embodiment of the Shriver and Small method in which real-time examination of the proxy server is performed, as the proxy server is handling requests the path of the web pages that a user visits after a search is tracked to identify the search session.

In a preferred embodiment of the Shriver and Small method, the popular pick (or popular picks) for each search is determined. In this embodiment, the popular pick is defined as the last URL which has been reached as the result of a search, that is, the last link examined, and found to be on the list of accessible URLs. Since this is the last page that the user visited as the result of the search, it is assumed that that page was the goal of the user's search. This popular pick is stored along with the search in a database. In another embodiment, the popular pick may be the page or site which was explored for the longest time, or may be identified in some other way from the pages accessed by the user. In yet another embodiment, instead of just one popular pick, a number of pages may be stored as popular picks for one search. In another embodiment, users may designate pages as popular picks while performing searches, and pages so designated are stored, with searches, as popular picks.

The proxy server log may be examined periodically in order to mine further searches and popular picks for the database.

After the creation of this database has been completed, and searches and popular picks have been stored, the preferred embodiment of the method examines users' HTTP requests in real-time, at the same time simultaneously sending the requests on to the web server to be processed. If the HTTP request is not a search engine query, the request is simply processed as per usual. However, if the HTTP request is a search engine query, the database is searched to see if the query can be found in searches which have been stored, together with their popular picks, in the database. If such queries are found in the database, the corresponding popular picks are displayed for the user along with the results from the search engine. The popular picks might also be displayed before the search engine results arrive at the web browser. If there are a number of popular picks, then they can be arranged in order of (presumed) importance to the user, e.g. in order of frequency—that is, if three searches result in two popular picks, the popular pick that was the result of two searches will be listed first, followed by the popular pick that was the result of only one search. To make the data more meaningful to the user, statistics such as the percent of the time that the popular pick was chosen when the query was searched can be displayed, along with the popular pick URLs.

The popular picks provided may be from searches performed on any search engine, or searches performed on the specific search engine being used.

In a preferred embodiment of the Shriver and Small method, when the database is searched to see if a query can be found in the query/popular picks entries stored, the query need not be an exact match. Because users frequently use slightly different words when searching for the same thing, related searches may yield valuable information.

An example of processing that could be performed on the query is to find all queries in the database that the current query is a subset of; an example of this is a query of "FOCS" and match from the database of "FOCS conference". A second example of processing is to find all queries that the current query is a superset of, an example of this is a query of "FOCS conference" and a match from the database of "FOCS". Another example is to find all queries that have terms that are abbreviations, synonyms, etc.; an example of this is a query of "NJ Transit" and a match from the database of "New Jersey Transit".

In another embodiment of the Shriver and Small method, after the creation of the database has been completed, the database may be used in a meta search engine, which allows users to specify which search engine(s) to use and also requests any available data from the popular picks database. The database may also be used to create a new type of search engine combining the popular pick database and a conventional search engine. This new search engine would display information on the addresses of pages matching a specific query, just as a conventional search engine would, and at the same time would provides users with popular picks. In these embodiments, the web page presented by the meta search engine or the combination popular pick and search engine can include a way for the user to specify which community they are part of (with appropriate security, if desired). The user's community may also be identified by cookies placed on the user's computer, by the user's host, based upon past queries from that user, or otherwise.

In a preferred embodiment of the Shriver and Small method, the data is aged so that popular pick URLs from searches that are older than a certain number of days are assumed to be of lower importance, or may be purged from the database entirely. In still another embodiment of the invention, a periodic search of the popular picks is performed to ensure that they are still valid URLs. In yet another embodiment of the invention, when the user has input a search for which the database contains one or more popular picks, a request for one or more of these picks is sent to the web server. Then, in one alternate embodiment, the pages are presented to the user, and in another alternate embodiment, the pages, having been requested, are more quickly available in a cache.

In a preferred embodiment of the Shriver and Small method, the real-time monitoring of users' request for search requests and provision of popular picks is implemented as an add-in module to the Apache web server (available from the Apache Group, www.apache.org).

An alternate embodiment of the Shriver and Small method uses this general technique of community based filtering to track URLs visited by members of the community, instead of only counting those visited as the result of a search. Each time a URL is, visited by a member of the community, that visit is logged in a database. A simple counter corresponding to that URL can be created (if no visits have been previously logged) or incremented (if the URL has been previously visited). This value of this counter can then be used as a measure of the importance of the corresponding URL to the members of the community. As above, the counter value can be used when deciding how to order or display search results.

In order to further refine the importance of the data collected by this Shriver and Small method, instead of a simple counter of all visits, a separate counter of recent visits or data tracking the time of visits may be maintained and the significance of older visits may be downplayed. A count of the number of discrete users visiting a specific URL may be kept if the proxy server logs or other tool for obtaining information includes user identification information. After database collection proceeds in this way, it can be used as described above.

According to the present invention, a search engine system will be able to identify more closely what the user intends when searching. This can be accomplished by initially pre-processing the search query and then using information about the user to present search results to the user in a manner that coincides with the user's preferences, interests, etc. One method is to provide feedback to the user while language is being parsed, disambiguating text by the use of lexical indexes, an expert database and data store of known information, formulation of known mental models for subject specific and area specific data. Characterization of results is based upon target user knowledge base as would be performed by a subject matter expert such as a librarian.

That is, when text is input on a form, or in a search input field, it can be sent to the search engine. If there are thousands of results, and the search server determines that the data returned are spread over a number of subjects, sources, etc., than the word or phrase typed into the input field of the search can be checked to see if it has multiple meanings, has special meanings in a dictionary of special word usage associated with a specialty or COI, or if the catalogue of expert knowledge has the word or phrase catalogued. The record in the COI or expert database could be used to select likely elements that would be of interest to the user.

Solutions will be presented which will support a "bird's eye view" of the search engine results. For example, if there are 200 results, a high-level view will be presented, which group the 200 results into 4–10 groups. The user can then telescope into the data, revealing more detail as the groups are examined.

In preferred embodiments, search results are presented to the user in the form of scatter grams and the like. The overall search results are displayed showing the relationships among resulting elements, with color, shape, and other attributes to differentiate among resulting elements being used. Preferably, icons and hot spots with text description are used to view details.

The benefits of the present invention can be realized in the following exemplary situation. An $8^{th}$ grader searches for information about AIDS. A librarian would be able to identify many things about the person that will help select the right search results from among all the possible items returned. Things a librarian might observe about a person include items such as age, apparent level of education, context of the person (work, school, shopping), language skills used during the dialog (level of language, choice of jargon, language), etc. The librarian would be able to identify sources that are appropriate for the age, language skills, and scope of the search. A college graduate, on the other hand, may be looking for information on AIDS. The librarian would be able to identify characteristics of the college student that play an important part in figuring out which search results are relevant. Such items may be identified by a system, and may be more accurate over time. A search application system could function as a personal librarian who knows a lot about the person doing the search, and who can do a good job matching search results including sources, depth, breadth, age of items, and other features, with the user. The search engine would know a lot about a person from the collective knowledge of others in the COI, implied characteristics of the individual, and some items that can be assembled into a profile over time.

With reference now to FIG. 1, an exemplary Smart Search system 10 incorporating an embodiment of the present invention as it relates to the world wide web is presented. An end user 12 using a web browser appliance 14 is connected to the internet 16 for the purpose of conducting information searches on the world wide web via the internet 16.

A web server front-end 18 is connected to the internet 16 and a server back-end 20 for the purpose of providing information search functionality to end user 12. Included in the front-end 18 are a communications interface 22 for sending and receiving message packets to and from end user 12, a page-by-page GUI sequence interface 24 for generating outgoing queries and receiving HTML pages, and a back-end interface 26 for communicating search information to and from back-end 20. It should be appreciated that while a GUI 24 is preferred, other interfaces such as audio interfaces could likewise be incorporated in the invention.

Back-end 20 includes a front-end interface 28 for communicating search information to and from front-end 18. A Smart Search engine 30 is provided that comprises functions, policies, and retrieval capability for identifying, locating and retrieving elements across a network of servers, as will be appreciated by those skilled in the art. Also provided are a DB (database) retrieval/searching component 32 for requesting DB information, a DB engine 34 for performing all physical DB retrieval and update functions, a DB administration component 36 for performing DB administration functions requested by administrator 38, a web crawler 40 which scans the internet 16 searching for information to store and index in Information Database 42, and a DB build/update component 44 that receives information from web crawler 40 and, in turn, uses DB engine 34 to build and update database 42. Other components, optionally used by Smart Search engine 30, are Lexical Dictionary 46, Expert Knowledge Database 48, Personality Profile Catalogue 50 and source profile catalogue 52. A data mining engine 54 is provided for building and maintaining information stores in relevant databases. A learning engine 56 is provided for building and maintaining the Expert Knowledge Database 48, the Personality Profile Catalogue 50 and a Display Techniques Database 58. Provisioning applications 60 are provided for provisioning users and relevant databases. A Community of Interest (COI) database 62 is provided for matching and assignment to user 12. More detailed functionality of Smart Search system 10 is provided in the following description.

Page-by-Page GUI Sequence Interface

The page-by-page GUI sequence interface 24 performs a number of functions and provides tools and guides to assist in information searches. It comprises a profile data collection function, a search query formulation function, a spell check function, definition disambiguation function, data display function, "tell me about the data" function, a prioritize features subfunction—by user selection and a prioritize features subfunctionby COI. It further comprises tools to help formulate a query, maps, charts, dictionaries, cross references, pushpins, calculators, and similar tools. It still further comprises a guide to reference materials (what's out there for whom), and a guide to experts (who's out there to ask). The system will learn about groups and individuals and, therefore, will be a reference resource itself.

Figure 2:
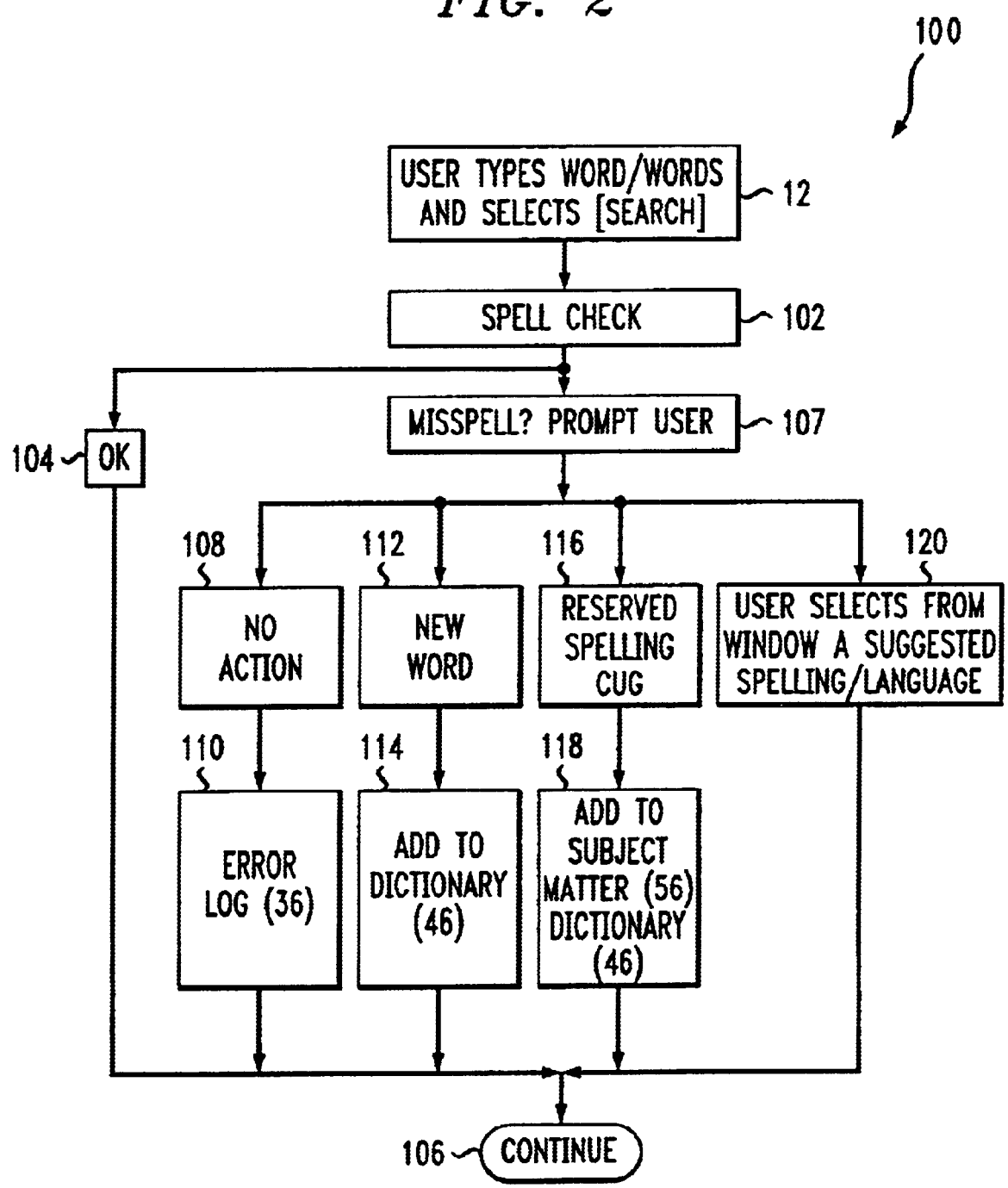
FIG. 2 is a flow chart of an exemplary, iterative spell-checking process.

Referring to FIG. 2, with continuing reference to FIG. 1, a spell check function 100 is illustrated. It is to be understood that the spell check feature may be implemented in all cases or only in selected cases. Such selected cases may include the situation where no results are presented to the user after the search.

As shown, a user 12 types a word or words and selects a search function. Spell check 102 intervenes before searching takes place and performs a spelling analysis of each word. For each word, a decision is made. If the word is spelled correctly according to dictionary 46, an OK node 104 is accessed which takes no further action on the word and continues processing at continue node 106. If a word is considered misspelled, a user prompt process 107 takes place. If user 12 does not respond, no action node 108 is accessed and an error log process 110 logs an error to the DB administration component 36, and processing continues at continue node 106. If user 12 wishes to add the word to dictionary 46, new word process 112 is accessed, and add-to-dictionary function 114 adds the word to dictionary 46 after which processing continues at node 106. If user 12 deems the word to be correct for a particular subject matter, node 116 is accessed and at node 118, learning engine 56 adds the word to a subject matter section of dictionary 46. Otherwise, user 12 selects a word from a window displaying suggested spelling and language at node 120, and processing continues at node 106.

Figure 3:
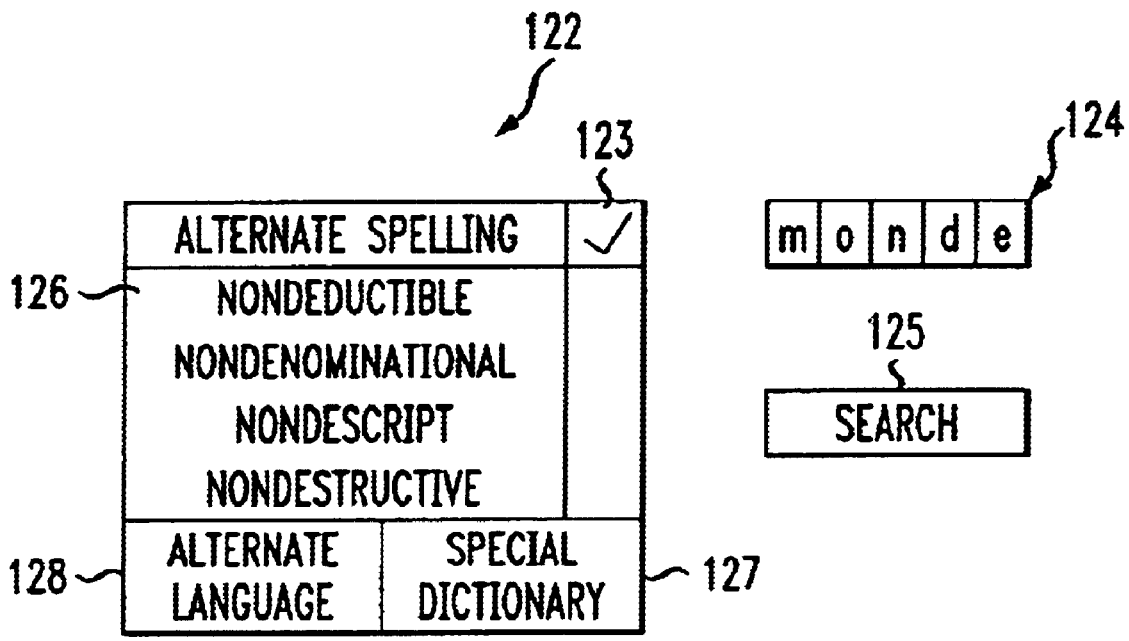
FIG. 3 is an illustration of a GUI spellcheck function.

For example, FIG. 3 illustrates an embodiment of a GUI spell check function. A spell check function window 122 is displayed, wherein a user has access to a mode button 123 allowing the user to select options to, for example, include pronunciation, include definitions, audio output, etc. In the example shown in FIG. 3, the user has typed input into box 124, selected search button 125, and spell check 102 has found an error. Window 122 has opened showing dictionary of choice entries 126 around the spelling in box 124, or software determined words. The user has a choice of specialized dictionaries listed in box 127 such as, for example, Electrical Engineering, Computer Science, Medical, Architecture, Business, etc. Alternate functions are offered in box 128, such as alternate spelling, alternate language, etc. For example the user can select from languages such as Spanish, German, French, and others.

Figure 4:
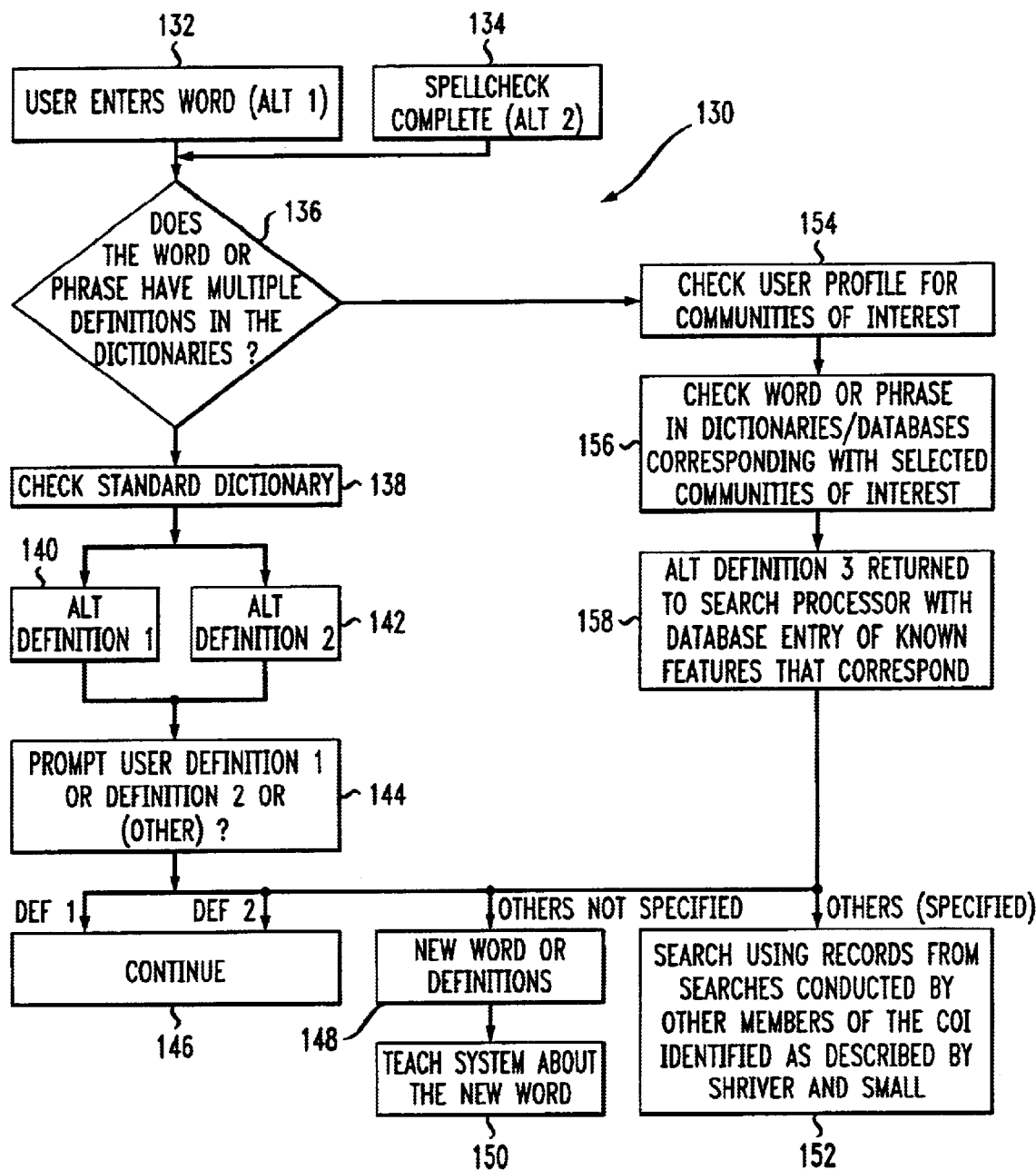
FIG. 4 is a flow chart of an exemplary, iterative process to disambiguate words.

With reference to FIG. 4, page-by-page GUI sequence generator 24 also includes an iterative process 130 to disambiguate words. As shown, a word or phrase is supplied from user 12 at entry point 132 or from a completed spell check operation 100 at entry point 134 and process 136 determines if the word has multiple definitions in the dictionaries 46. Process 136 will perform a standard dictionary lookup 138 to find alternate definitions 1 (140) and 2 (142). A user prompt 144 is provided to user 12 to request whether definition 1, 2, other (not specified) or other (specified) should be selected. If definition 1 or definition 2 is selected, processing continues at 146. If other (not specified) is selected, a determination is made on whether it is a new word at 148, and the system is taught about the new word at 150 before continuing. If other (specified) is selected, the search is conducted using records from searches conducted by other members of the COI at 152 as described, for example, in the Shriver and Small method described above, the patent application for which is incorporated herein by reference. Process 136 will also check, at node 154, profile catalogue 50 for a COI to which user 12 belongs. Process 156 checks the word or phrase in dictionaries and databases corresponding with selected COIs. From the results of process 156, process 158 returns alternate definition 3 for search purposes along with a database entry of known features corresponding to definition 3. Process 152 then conducts a search using alternate definition 3.

Figure 5:
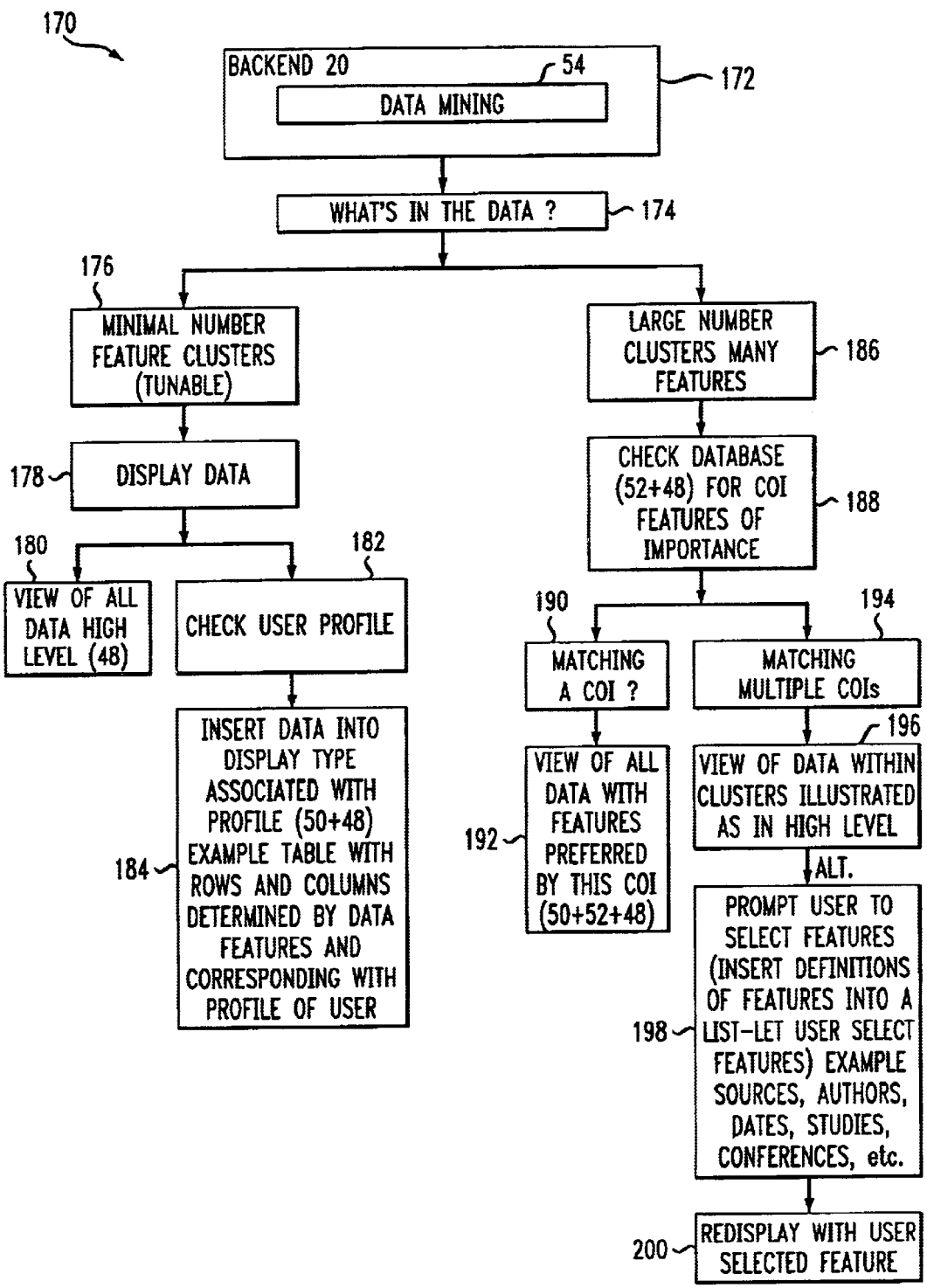
FIG. 5 is a flow chart of an exemplary process for a method of handling a case wherein a search has returned a large number of elements.

As shown in FIG. 5, page-by-page GUI sequence generator 24 further includes a process 170 for handling cases wherein a search has returned a large number of elements, or rather a number exceeding a preset threshold. Data classification engine 54, in backend 20, is invoked to analyze the data as a first step 172. This will attempt to place elements into feature clusters or groups. This process can involve accessing information about the elements derived from previous searches by all users, searches by users in the same COI, and any of the databases mentioned in this patent. A simple example might entail a broad clustering of the domains from which each element was drawn based on access patterns by members of different COI's. To minimize the amount of computation necessary per search session, the Data classification engine is expected to perform some or all of its learning functions offline.

After the Data classification engine has analyzed the data, a decision 174 is made to determine whether there is a minimal number of groups or not. If the number is minimal, processing continues at node 176 and data is displayed by display function 178. The data can be displayed as a view of all high-level data 180, or alternately, a check 182 of the user profile can be performed (in Profile Catalog 50), to determine how, at step 184, to display the data. For example, the display might comprise a table with rows and columns determined by data features. The information derived by the Data classification engine will also help inform the display process.

If the number of groups is not minimal, it can be large. If so, processing continues at node 186. A database check 188 is performed on the Source Characterization Database 52 and the Expert Knowledge Database 48, looking for the groups that are important. If a group is interesting to a single COI, processing continues at node 190, and a view function 192 shows all data with features preferred by the COI based on references to Profile Catalogue 50, Source Characterization Database 52, and Knowledge Database 48.

On the other hand, if database check 188 finds a group is interesting to multiple COIs, processing continues at node 194 rather than node 190. A view function 196 might present a view of the data with groups illustrated as with high level view 180, or alternately, the user might be presented with a prompt 198 wherein definitions of features are presented in a list, and the user selects groups from a list. For example, exemplary features might be sources, authors, dates, studies, conferences, etc. A redisplay function 200 then displays the user-selected features.

Figure 6:
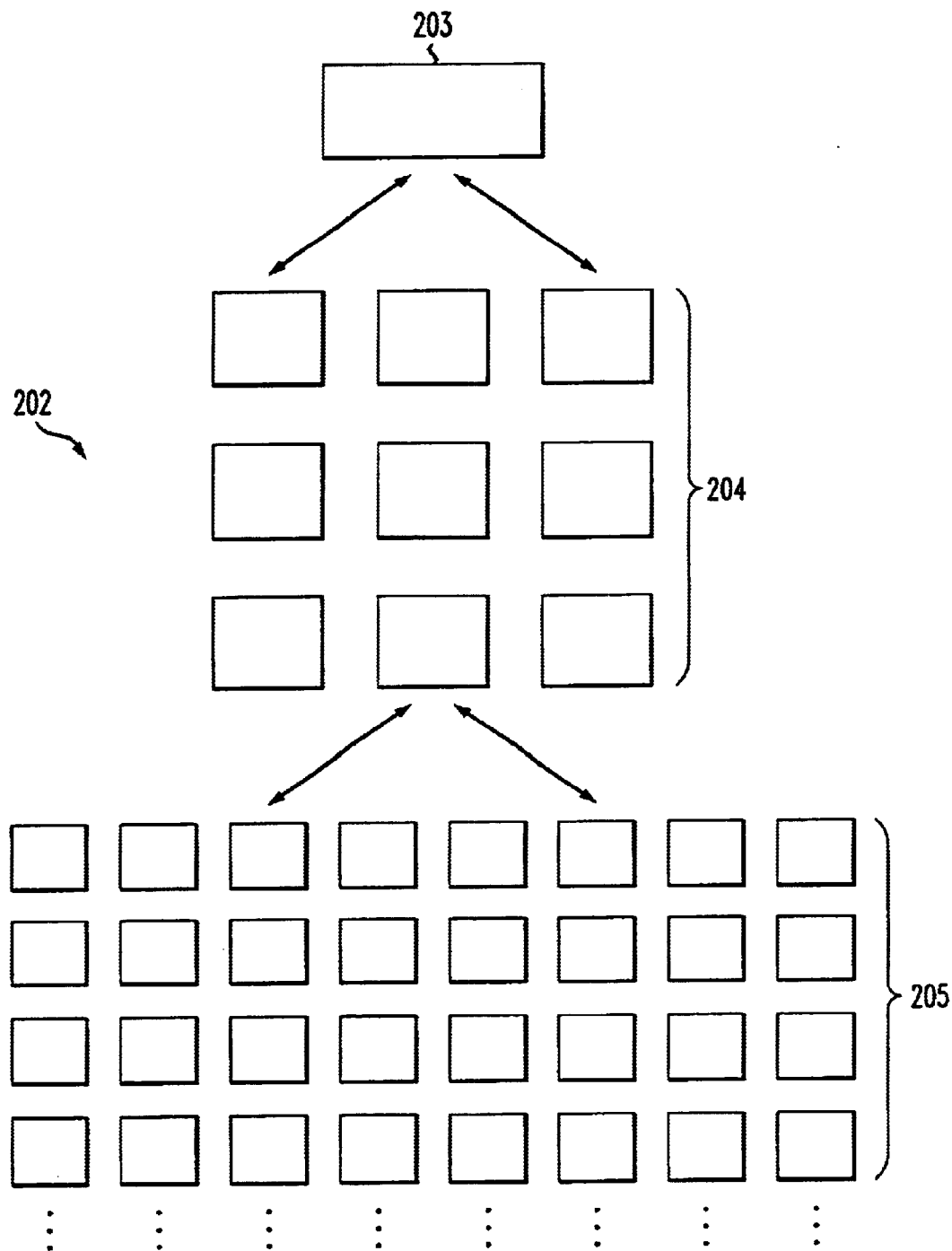
FIG. 6 is an illustration of a GUI architecture for displaying search results.

As an example, FIG. 6 shows a GUI architecture 202 for displaying search results when a large number of elements has been returned. GUI architecture 202 comprises a bird's eye view 203, a more detailed view 204, and a fully detailed view 205. The bird's eye view 203 is analogous to a geographic map showing a high level overview of the search results. The more detailed view 204 is analogous to zooming in to an intermediate level on a geographic map, and the fully detailed view 205 is analogous to zooming in to the most detailed view on a geographic map. View 205 will provide details of all data, means to retrieve pages such as links, etc. The user, of course, will only be presented with one of the above-mentioned views at a time, and will be able to select more detailed or less detailed views as needed.

Page by page GUI sequences in the interface include features and functionality as described above in connection with the method of the present invention and in greater detail below:

Profile data collection function—Interactive form to obtain user information including but not limited to: name, address, age, education, clubs, interests, employer, family members, groups, church, language, sources used, etc. The user can enter all or part or none of the information. The system will identify important characteristics of the user as the user continues to conduct searches, and select items from the results list. Items that are important will be added to the profile through a learning process by the system. Template profiles may be used that correspond with other members of know Communities of Interest in order to pre-populate some profiles, and make the provisioning easier for the user. In a corporation, for example, databases such as Peoplesoft may be used to identify characteristics of users.

Search query formulation function—Interactive form to obtain user requirements for the search including input fields, pull down windows with access to tools for formulating queries, configuration management window, etc. The user can identify types of queries to formulate and can select the functions from one of the tool windows. The configuration tool can add the individual functions together to provide a solution set matching the user's requirements. The configuration of the search can be accessed and can be modified at each node and the direction of the search may be changed on a subset of the results. A larger body of results can be obtained by selecting one of the nodes and delving deeper into a source, a feature, or another characteristic of the search results. The user can see that many of the results come from the magazine, "Living," and then decide to ask to view more of the "Living" references online.

Tools to help formulate queries—These tools help the user with typical calculations, definitions, directories of resources, maps, conversion tables, etc. Having access to such things as a user is formulating a query can help the user to more clearly describe the request. A toolbar can be customized to match Communities of Interest.

Guide to reference materials—This guide is initially generated by provisioning the Source Characterization Database 52. The system continues to enhance relationships between resources and users as it learns from the process of users conducting searches and selecting items from among the search results. The users can then look at the selected resources typically used by member of the specified Communities of Interest. These resources can be presented in an order of most selected or another preferred arrangement.

Guide to experts—The user interface provides a means to pull up a listing of members of each Community of Interest. Users identify when they want their identity to remain secured. Otherwise, members of the user group can seek the names of people or organizations having the same interests or expertise they need. The Personality Profile Catalogue 50 is used to create the listing of experts and interested persons.

Figure 7A:
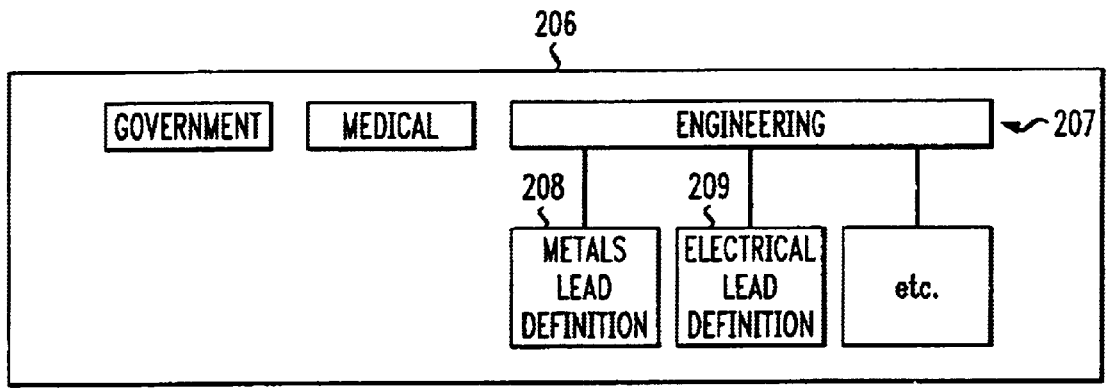
FIGS. 7(a) and (b) are illustrations related to a GUI disambiguation function.

Definition disambiguation function—A learning application is used to identify words or word groups with multiple meanings. The application first checks with the Communities of Interest in the Personality Profile of the user, and if there is a match between the subject of the definition and an area of interest among the users in that COI, then the search results are ordered with those items (COI relevant) and features displayed at the top or front of the results listing, table, or graphic. Other results which may not be a match with the COI indicators are still in the search results, but they are not featured at the top of the list, table, or graphic. The relationship among items is displayed as shown in FIG. 7(a) wherein, for example, disambiguation function window 206 is displayed to the user with COI clusters 207 displayed in the uppermost portion of the window. Alternate meanings of a word such as "lead" are displayed at the next lower level, such as a meaning 208 under the context of metals and meaning 209 under the context of electrical, etc. With the results of one COI clustering in an area and results of another COI clustering in another, the display method helps the user to see there are different types of answers to the search results, including but not limited to results from entirely different subject domains.

Figure 7B:
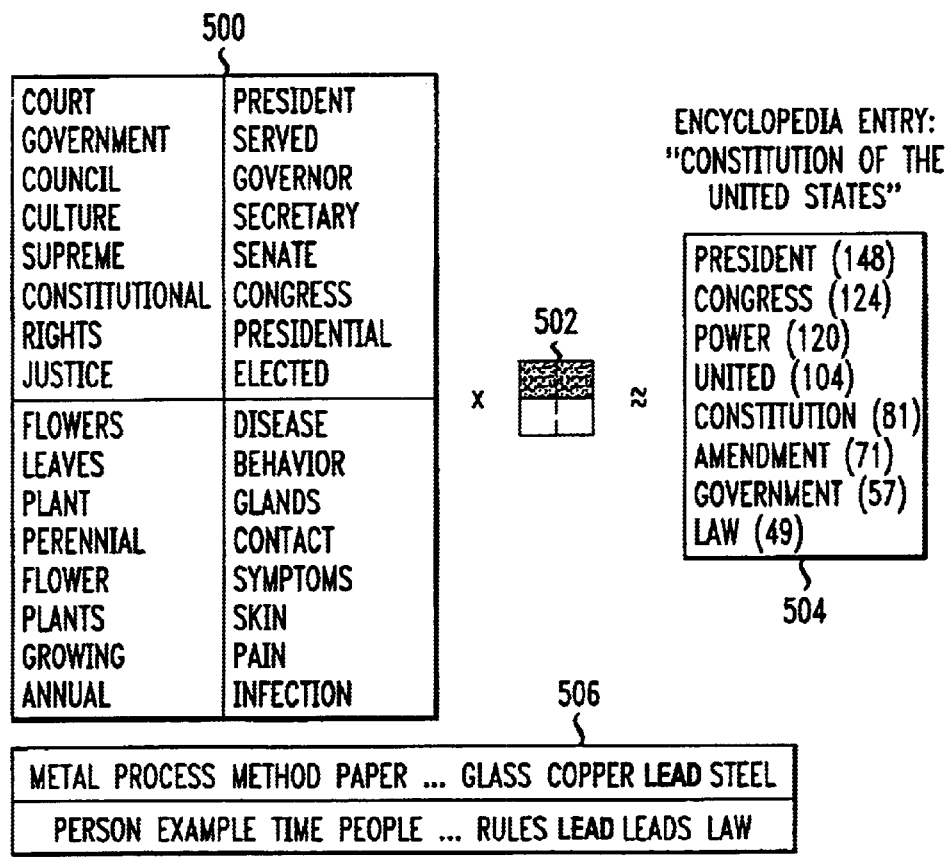

FIG. 7(b) shows the contents of an encyclopedia being processed using the preferred algorithm to build the lexical database which will be used as reference during the Smart Search system processes (GUI functions, results ordering, profile creation, COI, database creation, etc.). As shown, ordered lists 500 are processed using a weighted template or algorithm 502. The items in the list 504 represent the relationship of the words to the subject. As shown at 506, the words can be disambiguated.

Data display function—The data display application uses the Personality Profile Catalogue 50 to identify the user's COI. There is a corresponding generic profile of Display types in the Display Techniques Database 58. These profiles of display techniques are available to be used when little is known about the preferences of the user. If the user is continually presented with a type of display and chooses another one from the toolbar into which the resulting elements may be transferred, then the profile is updated to reflect the preference. As the population of users in the same COI continue to use the display functions, the system will learn more about the group as a population and will ultimately learn how to create a better Display Techniques Database entry for that COI. There may be refined differentiation among user groups observed in this manner and the databases will ultimately contain many more finely differentiated databases of Personality Profiles and Display Technique preferences.

"Tell me about the data" function—Often there are features in the data items returned that are not obvious to the person using the system. The features indicated by some of the current search tools indicate to the user how popular a site is, as measured by the number of hits and the number of links a site has. These features may not be the most salient characteristics of the results that the user is interested in. Rather, they are the characteristics that are easily used to separate the highly referenced items from the rare items. When a person is a member of a Community of Interest, he or she is more interested in the items that are timely, and relevant to their interests. Yet it's difficult to get at the nature of the data in the results. This search application can list in a window, all the clusters of data in sub-space. The application identifies a single method of extracting important features such as title, source, author, date, word in title, etc. When a source (Source Characterization Database 52) matches the COI and the word is in title, the application would rank the item high on the list. If another member of the COI selected this item from a search on the same word or phrase, then the item is ranked high on the list. Since these features are mined by the search application, the clusters are known by the system. The lexicon of the subject matter experts and the Source Characterization Database are used to identify a secondary list of features. These items are listed in a window for the user to review. The secondary list is ordered based upon the definitions of important features as stated by the Expert Knowledge Database 48. This system learns more about important features as each search is conducted and resulting items are selected from the list.

"Tell me more about this" function—Once search results have been returned, the application has more data about the search and its resulting elements. It knows what the sources are, etc. The user may wish to learn more about things the way they can in the library. Once a person gets to a bookshelf or magazine rack in a library, many items related to the original search are present. These items may not have been explicitly listed in the search results but they are of potential interest to the user. The graphical user interface permits the user to continue a search by selecting one branch of the search and continuing in a more refined manner into the data that are related to the original search. Convenient methods of performing this function include using the Source Characterization Database 52 to categorize the results and preferably provide a link to results titled "Would you like more magazine articles about pedigreed cats?" The user could then access the information if desired. The Community of Interest is also used to prioritize the questions asked of the user. The Expert Knowledge Database 48 maintains and updates the query formulation function.

Prioritize features sub-function—The user has the opportunity to use an automated method of prioritizing features. This automated method relies on the expertise of the librarians who are informed about the subject matter, about searching, and about resources. These preferences are available in the Expert Knowledge Database. This database can learn and modify itself to more finely differentiate the resources used by the populations of users. The user can also select priorities by looking at the features presented on the graphical user interface including but not limited to: title, author, resource, date, persons, also about, etc. The third method of redefining a search by prioritizing features of the data includes selecting a Community of Interest profile to impose a priority on the search results.

Community of Interest (COI) Database

Community of Interest database 62 contains provisioned and learned information about COIs. It contains histories of searches conducted by members of COIs. Provisioned data includes pre-populated information including catalogues of known professions, hobbies, demographic groups, etc. It contains references to lexical dictionaries, sources preferred, user profiles, display techniques, etc. It also contains references to Source Characterization Databases.

Learned information includes: new COIs that appear from refining the data in the database as new searches are conducted and population clusters appear in the data. Learned information can include: name of profession, distinctions among a profession, (also name of a hobby, distinctions among a hobby, etc.), features of users that increase refinement of demographics, markets, geography, language skills, etc.

To effectively provide service to new users, and those identified for the first time with a COI, a pre-populated global description can be used. Library lists and Indexes of Job Classifications may be used to begin the database. This will assist in filling in the spaces of COI's. Looking at the sources available online and the descriptions of the target audiences will also provide a piece of the COI database.

Once users of the system collect around each COI, the basic database representations may be modified to reflect the measurable requirements of the actual members of the group. The database will contain job categories, population categories, demographic information, population segmentations, memberships of known organizations and groups, hobbies and interests categories, etc.

The database will contain a blueprint to assist in identifying relevant items from a list of search results. The user can select one of the COI's from a list to self-identify. A provisioning process may assign a person to a COI (as in a company database, job skills database, information/ corporate information directory, etc.). The database will be pre-populated with terms representing known features of interest to the COI. When search results cluster around these features, they will be used to determine display priorities over other features that may be identified in the data.

With specific reference to the figures, results are finely differentiated communities with characteristic interests and preferences. With continuing reference to FIG. 1, FIG. 8 illustrates, in tabular form, how data might be organized in COI Database 62. A professions table 210 comprises rows wherein a first column 212 contains identifiers for each unique profession. A second column 214 contains a definition of the corresponding profession. A third column 216 might contain lexical words associated with the profession. A fourth column 218 might contain distinctions unique to the profession to while a fifth column 220 could contain demographic data for the profession. Table 210, like other tables in COI Database 62, is not limited to the above-disclosed information as additional columns can be imagined that could contain any sort of information associated with each profession.

For each profession within database 62 there can also be a lexical table such as electrical engineering table 230 which is organized in rows wherein a first column 232 contains a lexical term, and a second column 234 contains a definition for each term. A second exemplary table could be architecture table 250, likewise containing lexical terms in first column 252 and corresponding definitions in second column 254.

COI Database 62 preferably contains other types of data related to COIs. For example, database 62 preferably contains a display techniques table 240, arranged in rows wherein a first column 242 contains a unique identifier for a display technique, and a second column 244 might contain information relating to chart formats for the associated display technique. A third column 246 might contain table format information for the associated display technique, and so forth.

Personality Profile Catalogue

With reference back to FIG. 1, Personality Profile Catalogue 50, besides containing profiles unique to individuals, contains personality profiles for celebrities and generic profiles for miscellaneous use or, perhaps, for use as templates for defining initial individual profiles. It should be noted that Personality Profile Catalogue 50 and other databases are not limited to the above-mentioned exemplary personality profiles.

Creating a COI profile in profile catalogue 50 for a user with or without registration by user would be done by:

assessing technical papers, web site, email, subscriptions (including source characteristics), mail lists to and from, items forwarded, organization charts, directory entries, query entries of the individual user 12 to determine special interests and clustering of features in the elements identified (a selection of these and other items can be assessed depending on access provided through group service arrangement, or individual subscription);

borrowing a personality from a generic group similar to the individual then making changes as more information becomes available;

assessing selected items in search results relating to an area of interest to determine characteristics and associating them with the user's profile;

determining an age or social context of the individual;

determining groups and individuals associated with the individual by reviewing email, technical papers, telephone and email address book, post, articles containing individual's name or member of group, etc.;

determining an individual user's relationship to the group: casual, involved, etc.;

recording multiple COI's of the individual using the system;

determining attributes relating to understanding and use of language including but not limited to: primary language used, other languages used, competence and performance in each; and, determining attributes of language for each COI including but not limited to: access to vocabulary of each specialty, estimated sophistication in subject or area of interest, facility with vocabulary in specialty (competence and performance).

In addition, preferably there exists a database of catalogues of sources used in research, in a library, for market research, etc. The items in the catalogues, (books, journals, etc.) have known target audiences, and actual audiences. The audiences can change over time, and that is something we can observe by looking at the users selections online and updating the database. Over time there will be more fine granularity in the specialization of the sources. (Perhaps because online, magazines and journals may not be tracked in their entirety, but may be counted by the individual articles, ads, etc.) There are temporal facts about elements, people, etc. that will make one item more desirable than another. For example, a research cardiologist might only be interested in items that are published within the past two years. When looking for a conference, he or she is only interested in conference listings that are recent, and that will occur at least one month in the future (for planning purposes). A student $8^{th}$ grader may not be that sensitive to the calendar items. There is a different calendar that's important to a student. School year, holidays, time of day, etc. There may be some reason to select information or display information based upon the calendar people live by.

As such, creating a proxy profile in profile catalogue 50 for a COI would be done by:
 identifying sources that fit the COI (an additional tier of sources should exist to provide flexibility); and,
 identifying a calendar for relevant items that best fits the COI (a secondary calendar should exist).

Figure 10:
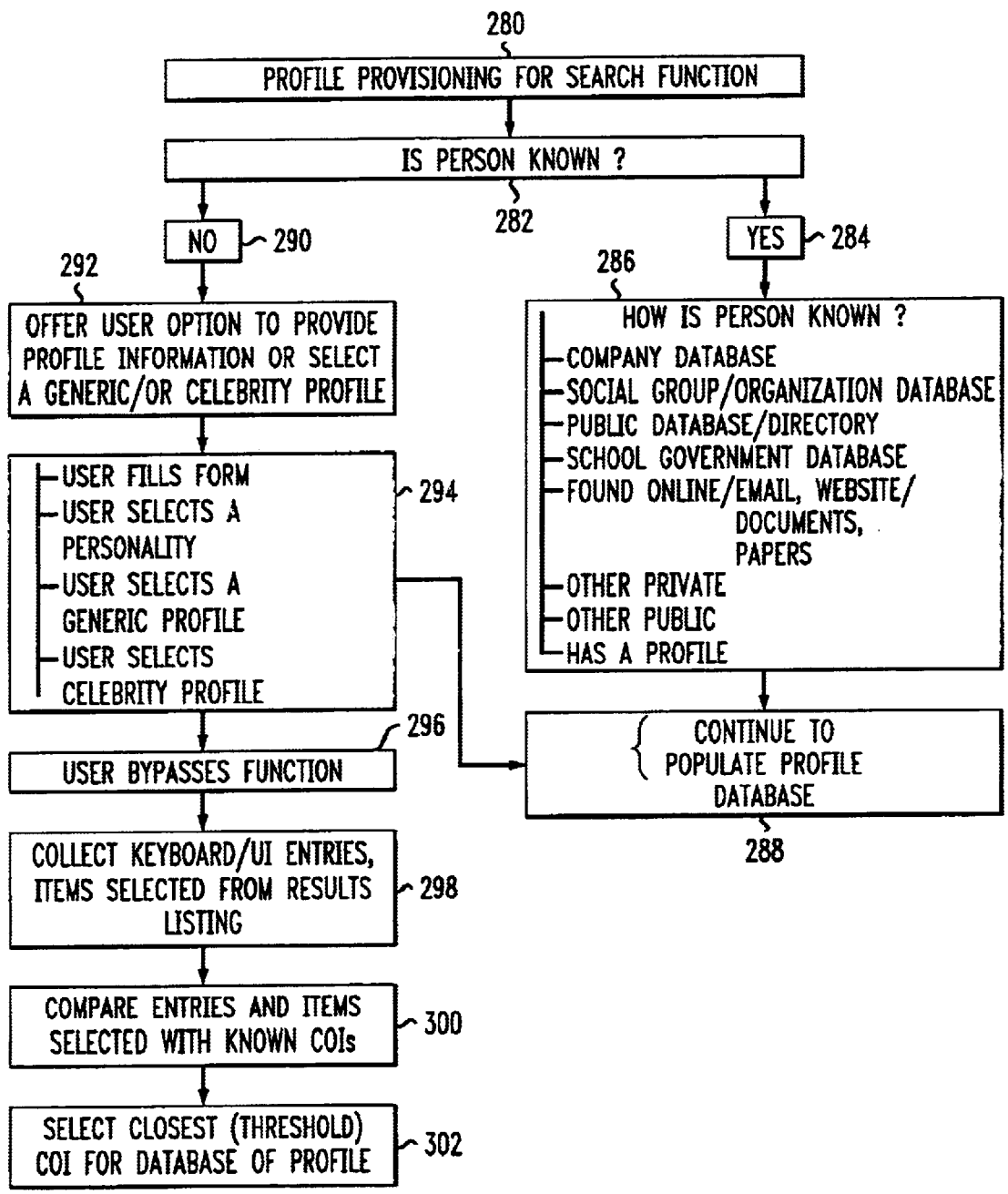
FIG. 10 is a flow chart showing profile provisioning for search function.

FIG. 10 provides a flow chart of a Profile Provisioning for Search Function 280. A test 282 is first performed to determine if the user is known. In case test 282 returns a yes answer, yes path 284 is invoked where test 286 determines how the user is known. Possible answers to test 286 are, for example, a company database, a social group/organization database, public database/directory, school government database, found online (email, web site, document, papers, etc.), other private, other public, and has profile. Once it is determined how the user is known, processing continues at node 288 to populate profile catalogue 50.

Returning to test 282, if a no answer is returned, no path 290 is invoked where function 292 offers the user the following profile options: provide profile information, select a generic profile, select a celebrity profile, or bypass the profile option. If any choice other than the bypass option is returned by the user at 294, processing continues at node 288 to populate profile catalogue 50. Bypass path 296 is invoked if the user chooses to bypass the profile option, where collection function 298 gathers keyboard/user interface entries and items selected from a results listing. Compare function 300 compares the items gathered by the previous collection function with known COIs. Select function 302 then selects the closest COI for addition to profile catalogue 50.

Figure 11:
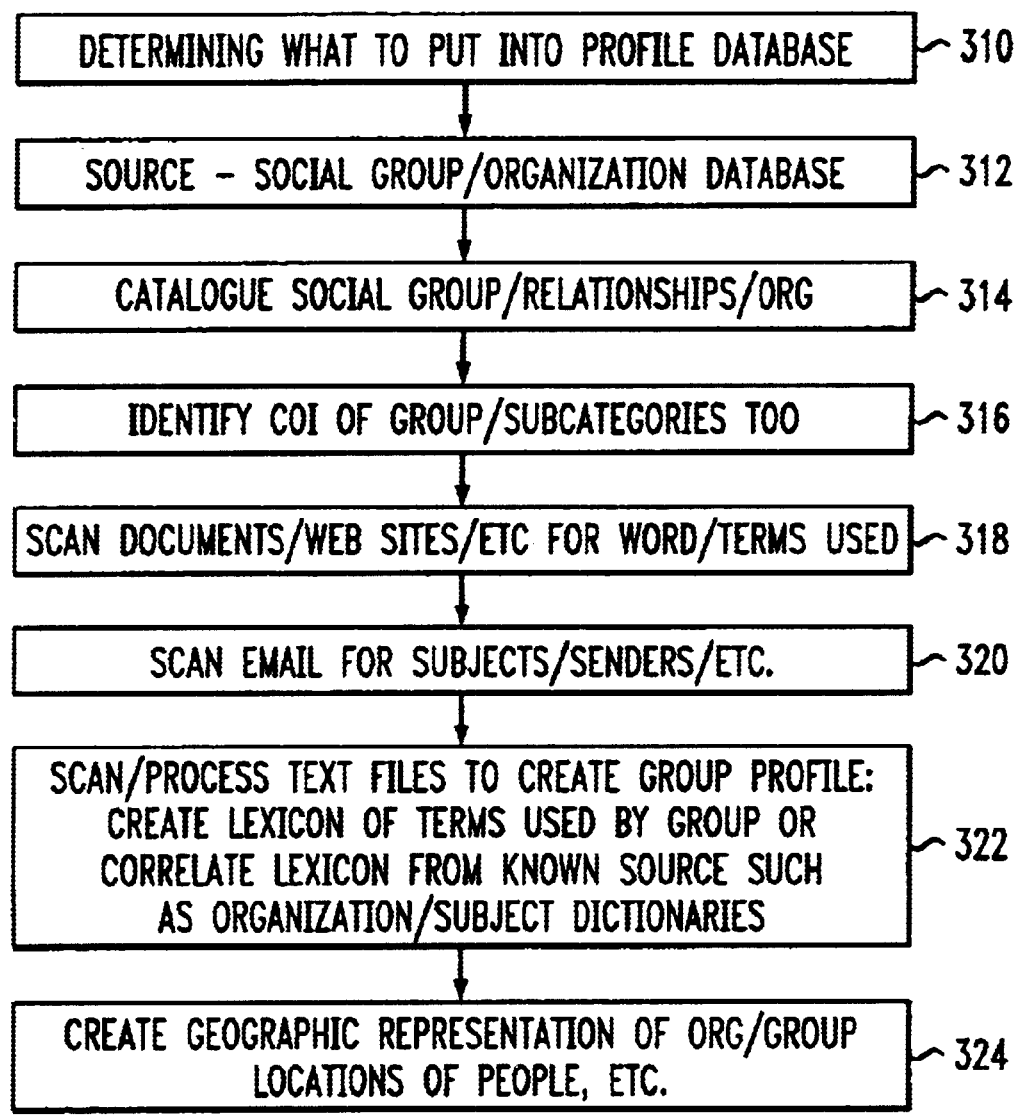
FIG. 11 is a flow chart showing a process that determines what to put into a profile database if the source is a social group or organization.

Once it is determined that Personality Profile Catalogue 50 needs to be populated or updated from the above-described procedures, the task is reduced to determining what to put into Personality Profile Catalogue 50. FIG. 11 shows a flow chart for a portion of process 310 to make this determination, and this determination is made depending on the source of information. Process 312 handles the case where the source is a social group/organization database.

Catalogue function 314 catalogues the social group, relationships and organization into profile database 50. Identify function 316 identifies the COI of the group including subcategories for populating profile database 50. Scan function 318 scans documents, web sites, etc. for words and terms to populate profile database 50. Scan function 320 scans email for subjects, senders, etc. to populate profile database 50. Scan function 322 scans and processes text files to create a group profile. It creates a lexicon of terms used by the group or correlates the lexicon from known sources such as organization/subject dictionaries. Create function 324 creates a geographic representation of the organization/group, locations of people, etc. to populate profile database 50.

Figure 12:
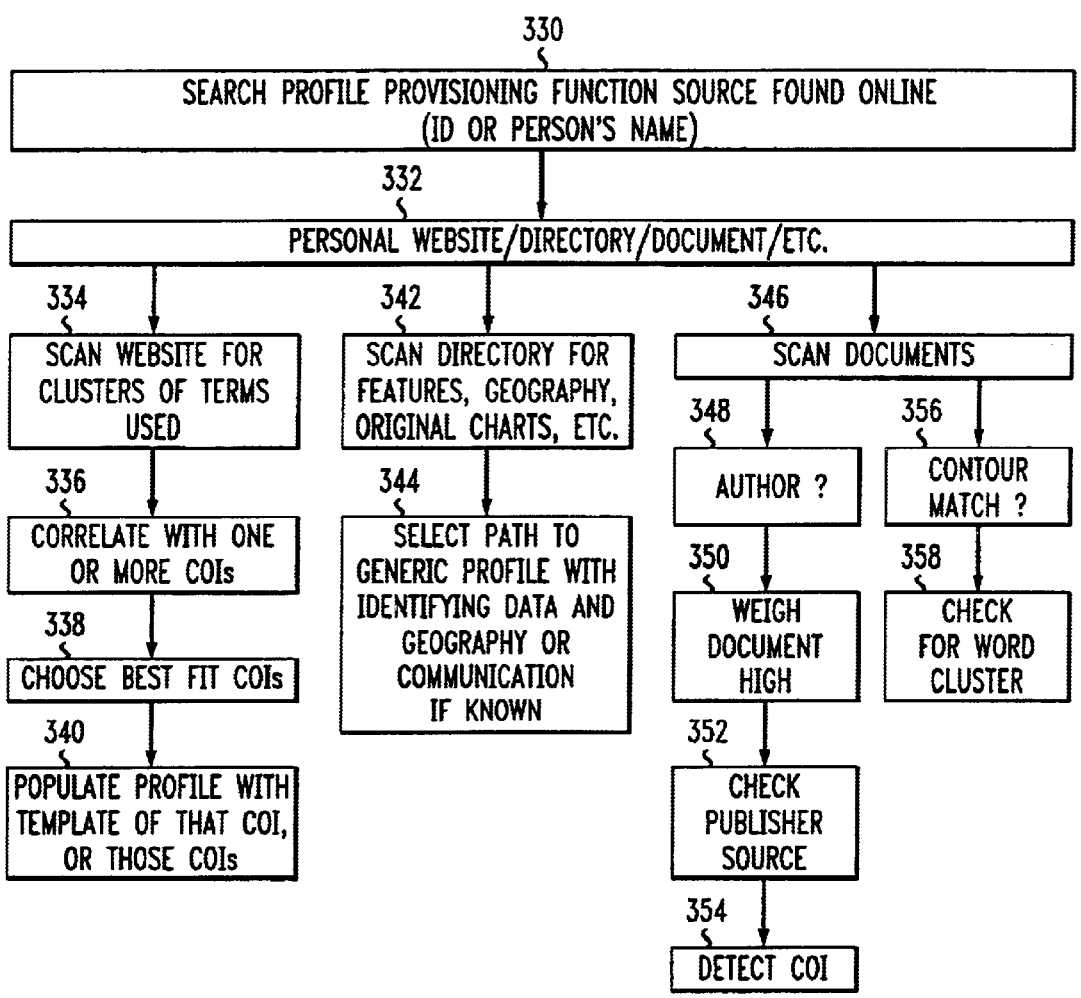
FIG. 12 is a flow chart showing a process that determines what to put into a profile database if the source is found online.

FIG. 12 shows a flow chart for process 330 which handles the case where the source is found online based on the user's ID or name. Decision function 332 determines whether the source is a personal web site, directory, document, etc. If the source is a personal web site, scan function 334 scans the web site for clusters of terms used. Correlation function 336 correlates the clusters with one or more COIs. Matching function 338 chooses the best fit COIs, and populate function 340 populates profile catalogue 50 with a template of that COI or COIs. If decision function 332 determines that the source is an online directory, scan function 342 scans the directory for features, geography, organization charts, etc. Select function 344 selects a path to a generic profile with identifying data and geography or communication, if known. If decision function 332 determines that the source is an online document, scan function 346 scans the document and determines if an author is known. If an author is known, path 348 is traversed, and weight function 350 weighs the document high because the author is known. Check function 352 attempts to determine the publisher source, and matching function 354 determines a best fit COI. If the author is unknown, however, content match function 356 is invoked, and check function 358 searches for word clusters of interest.

Figure 13:
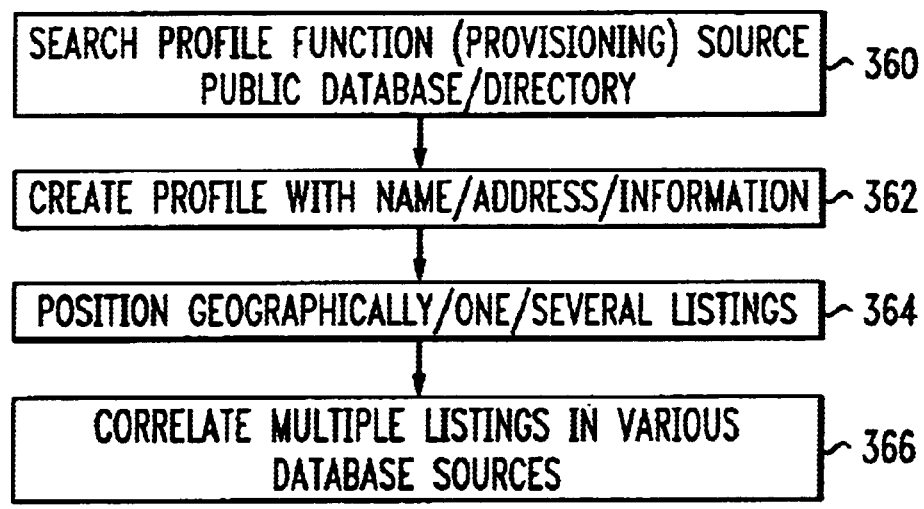
FIG. 13 is a flow chart showing a process that determines what to put into a profile database if the source is a public database or directory.

FIG. 13 shows a flow chart for process 360 which handles the case where the source is a public database or directory. Create function 362 creates a profile with name and address information. Position function 364 determines a position geographically for one or several listings, and correlation function 366 correlates multiple listings in various database sources.

Figure 14:
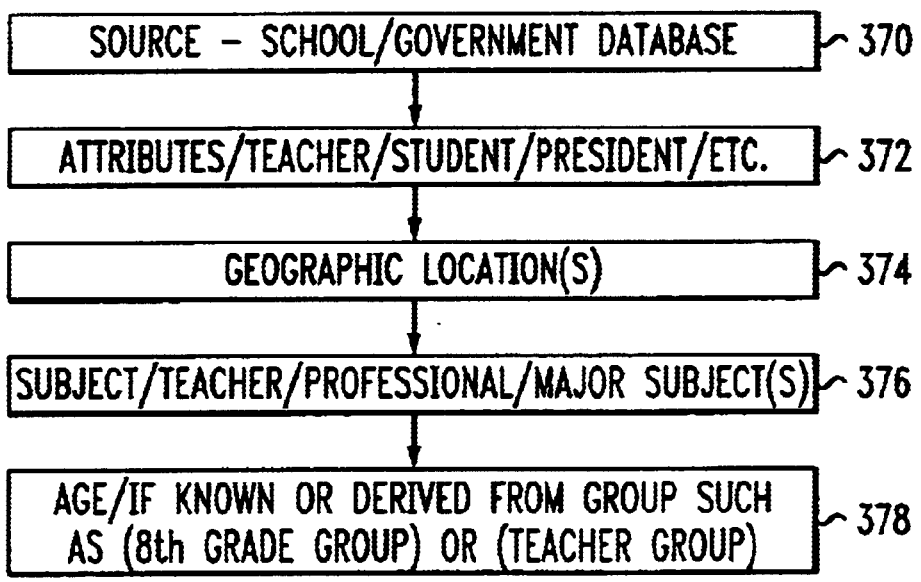
FIG. 14 is a flow chart showing a process that determines what to put into a profile database if the source is a school or government database; and, FIG. 15 is a flow chart showing a process that determines what to put into a profile database if the source is a company database.

FIG. 14 shows a flow chart for process 370 which handles the case where the source is a school or government database. Attribute function 372 determines attributes such as teacher, student, president, etc. Geographic function 374 determines a geographic location or locations. Subject function 376 makes subject determinations such as teacher, is professional, major subject headings, etc. Age function 378 determines the age if known, or derives an approximate age from group information such as, for example, "$8^{th}$ grade group", "teachers group", etc.

Figure 15:
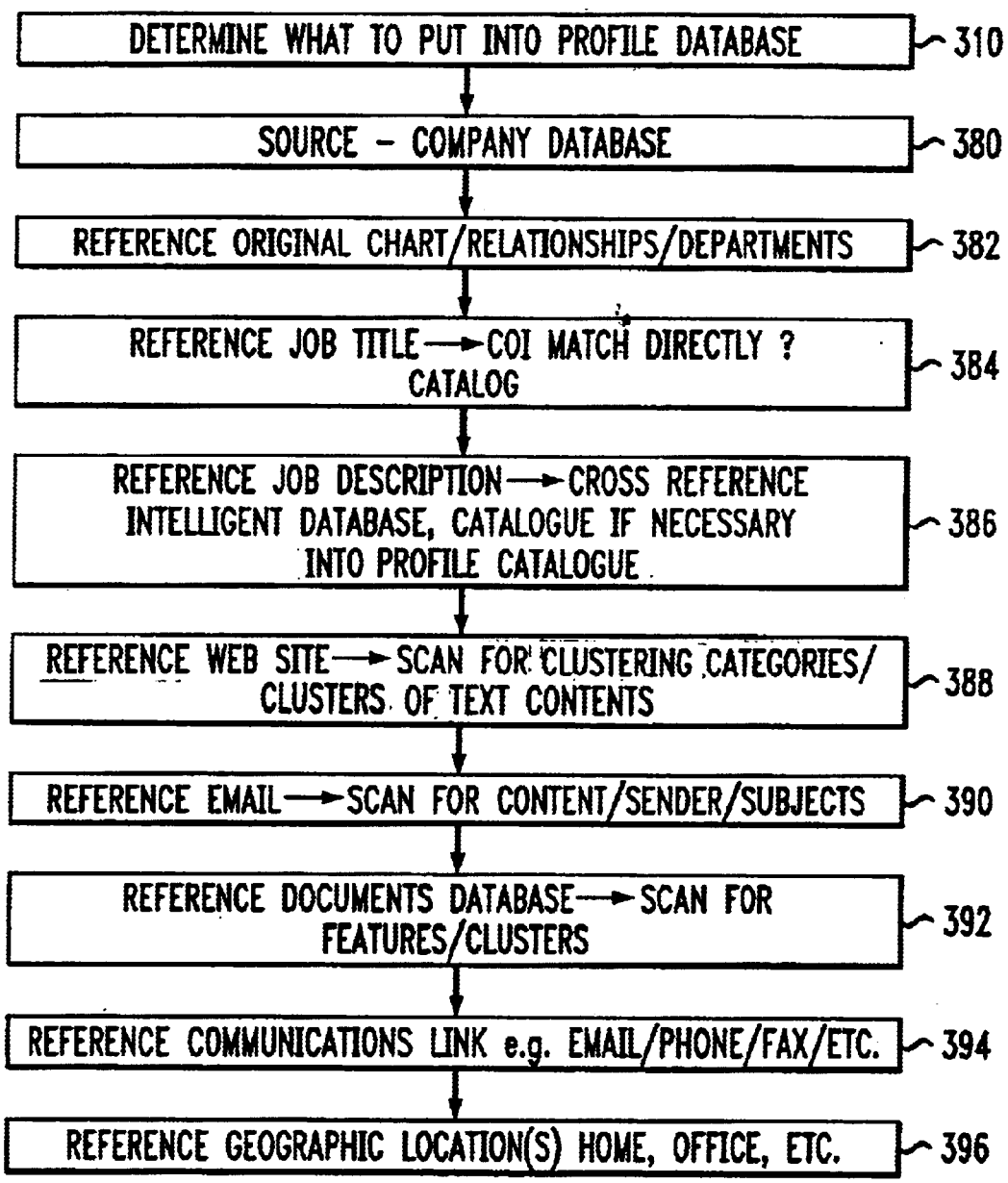

FIG. 15 shows a flow chart for the final process 380, of determination process 310, which handles the case where the source is a company database. Function 382 references organization charts, relationships and departments. Function 384 determines a job title, and if a COI matches the title directly, populates profile catalogue 50 with the COI. Function 386 references the job description, and performs cross-referencing of intelligent databases, and catalogues information if necessary for populating profile catalogue 50. Function 388 references any referenced web sites and scans those web sites for clustering categories and clusters of text contents for determining COIs. Function 390 references emails and handles these with appropriate scanning functions, scanning for content, senders information and subjects. Function 392 references documents databases and scans for features and clusters within those databases. Function 394 references communications links such as, for example, email, phone, fax, to determine features and clusters for correlating to COIs. And finally, function 396 references geographic locations for home, office, etc. for populating profile catalogue 50.

Source Characterization Database

Source Characterization Database 52 contains catalogues of sources, target audiences, demographics, publishers, useful features, cross references, COI references, provisioned and learned, market research, dates, frequencies of updates and types of source (electronic, broadcast, video, personal web site, etc.).

Creating a proxy source catalogue in characteristics catalogue 52 would be done by:
- identifying known subject matter sources including but not limited to journals, newspapers, magazines, web sites, brick and mortar sources, paper published sources, etc.; and,
- populating the catalogue 52 with descriptions, links, profile of language, type of data available in each source, availability online.

Thus, resources on the network of networks can be catalogued by labeling each known resource (journals, periodicals, publications, organizational publications, professional publications, newspapers, personal sites, business sites, catalogues, library resources, market research, etc.), identifying COI's interested in each known resource, correlating vocabulary used in known resources with COI, and periodically checking the vocabulary and update it with new buzz words, jargon, etc.

Expert Knowledge Database

Expert Knowledge Database 48 contains knowledge about sources, where to look, where else to look, what features are important to whom, how to formulate query, knowledge about user groups (age, education, language, language skills, preferred data display methods, etc.) and generic solutions.

Lexical Dictionary

Lexical Dictionary 46 contains a database of words, phrases, etc. used, represented by, definitions and usage in general population and also by individual Communities of Interest.

Display Techniques Database

Results of a search should be processed by the search application to reveal to the user information about the items returned and also information revealed by the data returned. The resulting items should cluster in selected subspaces. The search application can use COI's of the user to disambiguate clusters in the elements returned. The search application can offer alternate views of the results based upon other known COI's that would use the data from sources returned. Data clusters in subspaces can be identified as significant based upon the interests of the COI group.

In this regard, Display Techniques Database 58 contains a database of forms, formats, charts, tables, graphics, color references, calendars, icons, etc. of known data display images, audio, etc. It contains cross references for age, education, Community of is Interest. Level of language use, etc. to determine how to present search results, data elements, summaries, queries, alternative features (of data) list, optional functionalities of search applications, etc.

To illustrate the general flow of an information search, reference is made back to FIG. 1. As will be appreciated, the end user 12 will typically be using a standard web browser 14 such as Netscape Navigator running on a personal computer, connected to the internet 16 in standard fashion either by dial-up connection or LAN. User 12 would then connect to a site running an embodiment of the present invention for the purpose of doing information searches. After connecting to such a site, interface 24 would send an HTML page through communications interface 22 to the end user wherein the HTML page would have provision for entering search criteria and data along with instructions and advice on how best to enter such criteria and data. The end user 12, after filling in search data, would submit the HTML page to front-end 18, which would receive the page at communications interface 22 and pass the page to interface 24 for decoding. Interface 24 would extract only pertinent query request data and criteria from the HTML page and send it via back-end interface 26 to back-end 20 where front-end interface 28 would receive the search data and criteria and, in turn, pass it to Smart Search engine 30 for processing. Smart Search engine 30 would process the query request, explained in more detail in the following description, retrieve solutions from Information Database 42 via DB retrieval component 32 and DB engine 34 with the assistance of Lexical Dictionary 46 and Expert Knowledge Database 48. After retrieving the solutions from Information Database 42, Smart Search engine 30 sends all solutions, or a selected subset of solutions if a large number of solutions exist, back to the end user 12 via essentially the same path by which the query request was received.

Figure 9:
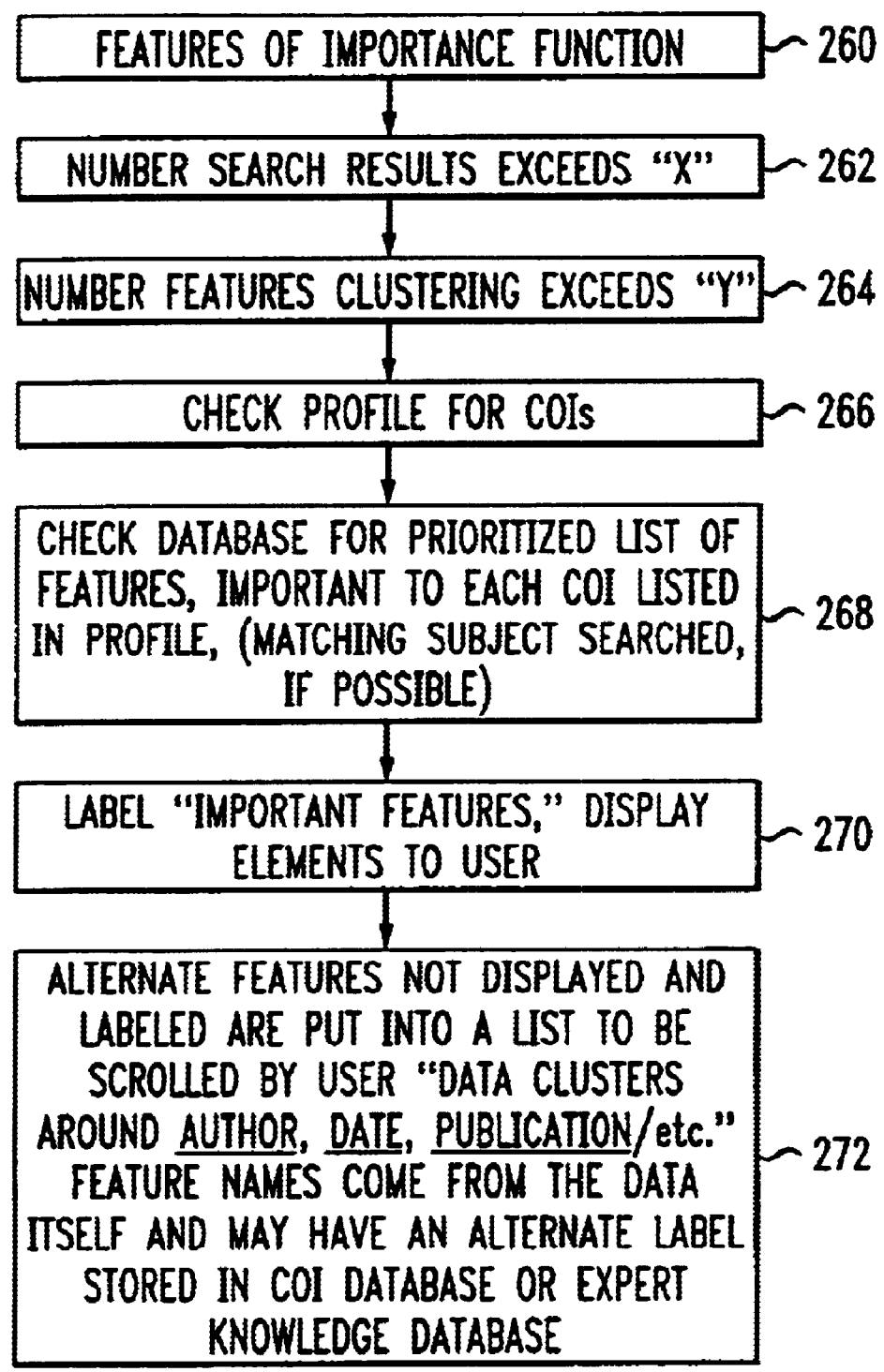
FIG. 9 is a flow chart showing how a large number of search results is handled by a Smart Search system.

A flow chart is provided in FIG. 9 illustrating how Smart Search 10 responds to a condition where a number of results and number of clusters exceeds predetermined threshold numbers. A Features of Importance function 260 is invoked which first performs a threshold test 262 on the number of results returned by the search to determine that the threshold is exceeded. Upon determining that the number of results exceeds a predetermined threshold, clustering test 264 is performed to determine that the number of clusters also exceeds a predetermined threshold value. Upon determining that the number of clusters exceeds a predetermined threshold, a user profile check 266 is performed to determine relevant COIs. Following that, a database check 268 is performed to develop a prioritized list of features important to each COI listed in the user's profile (matching the subject searched if possible).

An important features display function 270 is performed to provide a display to the user labeled "Important Features". Procedure 272 puts alternate features not displayed and labeled into a list to be scrolled by the user entitled "Data Clusters Around Author, Dates, Publication, etc." Feature names come from the data itself and may have an alternate label stored in the COI database 62 or Expert Knowledge database 48.

Within Smart Search system 10, a system and method using several applications, policies, and attributes combined with search engine functionality is utilized. User 12 can perform many activities with this functionality. Traditional search applications tend to emphasize the face of a particular search engine which links the user to other web sites. While the proposed system can perform in that situation, it also takes advantage of a search engine within a context. A concierge service for an online product or service provider is an example of a context in which this system and method may be used. User 12 can register or enter a search situation through the Smart Search engine 30 capabilities. The user 12 should be able to send his or her personality to the Smart Search system 10 without passing along identity.

Various aspects of personality can be determined, solicited, or derived. Personality helps the Smart Search system 10 determine how to disambiguate terminology used in a search. One way in which the system determines how to disambiguate terminology is to know in which COIs a user 12 has membership or is likely to have membership or is a temporary member thereof.

The personality profile catalogue or database 50, as noted above, is a database that can identify characteristics of the user that will assist in formulating a query, determining which items in a list the user may be interested in, selecting a display technique, determining which sources to prioritize, etc. Problems faced in using the strategy of COI for search include being able to identify the COI of the user without collecting specific information from the user. The system can store a series of default profiles, then observe user behavior, query user preferences, and modify the profile for future searches.

Specific problems associated with creating a search application with features pertaining to COI include: gathering data about each member of the community, creating a profile of the community, changing the profiles over time, learning from the individual and from the community about preferences.

Emphasis is on how users in a COI use words, relate to sources, relate to age of item, type of item selected, relate to display styles, report types, data manipulation methods, etc. Specifically interested in how words are used in reserved meanings, buzz words, etc. Discovery of the fact that a group of people use a particular word in a particular way and possibly a unique way that may be learned by the system and may be used to better understand what the user is looking for from a set of returned items. Focusing on gathering data and asking questions.

In addition to learning about the words used, the search results selected by other members of the same COI recently is used to order the search results for the current search as noted by Shriver and Small in the incorporated by referenced patent noted above.

If a user has to do a search in an area he or she is not generally searching in, he or she can "borrow" a personality for the search. Lists of personality types can be presented by the application. These lists can be displayed either before or after the search words have been entered. If they are displayed after, and the application determines that the request doesn't fit the existing profiles of the user, the user can be prompted to select from among the specialties indicated by the database. The user can be prompted to indicate if the search application correctly determined that this is an unusual search subject, or if the user expects to search in this subject frequently.

Prior art search engines acting on a search request return a large list of items generally ordered by popularity, number of links to sites, scope of sites, and other features of the data in the sites. A popular method of determining relevance is to look for word frequency, word proximity, word in title, words in meta-tags, etc. Often items being returned on a given search are so numerous, that an individual user 12 can rarely review all the items. It is difficult to determine if all sources for information on the subject were accessed or returned. It is also difficult to determine from lists which source may be a source used by experts in the field, as compared with a popular web site. Various elements affect popularity of a site and often have nothing to do with whether or not the site will provide accurate information to the person conducting the search, or information that matches the skill set of the individual. There may also be several completely different subjects or domains returned by a single search query, although to the user 12, the results do not relate at all to each other or to the initial query. They appear to relate only from the point of view of the functionality of the search engine. However, words, jargon, and phrases can have multiple meanings, reserved meaning, or new meanings. The traditional search engine will return all these items.

Smart Search system 10, however, will identify ambiguous and new terms and will identify with fine granularity, different abstract topics. These fine granularity abstract topics will be related to a Community of Interest and will help to define the personality of the user.

Smart Search system 10 will query the user 12 for further input or selection from among a list of possible topics to resolve ambiguous search terms. This can be done either initially as the search terms are being collected in the user interface 24, or after an initial search has been performed, and a number of search results are analyzed by the Smart Search system 10 applications. In some cases it will be done automatically when the personality of the user 12 is understood and the ambiguity is mitigated from that understanding.

Writing style in the sources selected by user 12 or by an expert will be used to identify characteristics of the COI. These characteristics will be catalogued by Smart Search system 10. Writing style of the user 12 will be characterized and stored in a personality profile 50 database.

Smart Search system 10 will review the data returned from a search and identify sources, dates of publication, scope of results, scatter of results, domains of search results. All results from the search will be identified, however, by using the personality of the user 12 from personality profile 50, elements matching the likely concept, and breadth or depth of sources will be organized into a results presentation. The user 12 can always pass by the initial results presentation and see the complete list of items returned.

Search results sources will be catalogued to identify characteristics of the sources including but not limited to: dates and frequency, COI, COI's, general level, degree and level of jargon, categories of resources (calendars of events, classified, technology reviews, etc.) and will be used to inform user about sources. The source characteristics catalogue 52 will record whether the source is a primary source, secondary source, web site, commercial publication, technical, business, fiction, or other type of source. Experts will annotate the source. Source participants can add information to the record about the source.

One method of presenting results is to list categories in a series of nested menu windows based upon the data returned and how it clusters in categories, and metacategories. Category names can be derived from the data and then recorded for future use by the Smart Search system 10 application. Categories can also be derived from the data with the supervision of an expert resource person, or subject matter expert. Category differentiation is based upon fine-grained understanding and differentiation among terms, phrases, reserved words, jargon, technical terms, sources selected, and resulting elements.

The complete results presentation will contain representations of each distinct concept represented in the results and not constrained by COI, and a reference to each data point in each concept representation. Since many elements in a search result list belong to more than one category or abstract concept, the relationship among categories will be presented.

The user 12 can see a presentation that will indicate the scope and scatter of results for a given query. In this way, an individual user 12 can see what information was accessed from Information Database 42, and the source of the information, and learn about the age of materials accessed. The interface 24 can be configured to reveal resource management techniques to the user 12. By knowing about the source and COI preferences, Smart Search system 10 can teach the user 12 which sources are used to get information by a COI. So a person entering a new field of investigation can learn which resources would be ideal for a person in that field. He or she would not have to try to figure it out from the long list of search results. Again, the user 12 can prune the list of returned elements or expand what is included in the list by manipulating the data as it clusters into source, date, time, author, type and other characteristics of the data.

When sources are identified by the Smart Search system 10 application, annotation from the cataloguing process will be made available. The annotation will inform the user 12 about the source and about who created it and who (COI) uses the source. This information may be provided by the source owner, an expert, or automatically determined. For certain applications Smart Search system 10 will also link to the main information center for the source identified.

The Smart Search system will observe members of COI's and will determine which sources are preferred by the COI's to improve matches for results of new searches. The Smart Search system will also use profiles of experts in the field, from Expert Knowledge Database 48, to teach the system 10 which features and sources are important. The system 10 will observe the age and frequency of new additions of information for COI's and will slide its time window along to match the data in the field as well as apply a reasonable calendar to the materials it presents. It is important to note, however, that archival searches may be desired. In this case, the user interface 24 will facilitate historic views of data, and views of data over an extended period of time or an extended resource set.

Features of results will be identified and structured in the user interface 24 so the user 12 can manipulate the order or prune the list based on characteristics that are available in the data such as age of article or source.

As part of the iterative input feature set of Smart Search system 10, the user interface 24 will prompt the user 12 for additional information to refine a search. Sequences of prompts will be created for general and specialized subjects, approaches to information gathering, and search styles.

Prompts will be created with librarian and or subject matter expert help from Expert Knowledge Database 48. Given a particular information need, how would a librarian or a subject matter expert go about asking a person what goal or important features are to be included? These queries can be formulated from within the context of an application, subscriber situation, or commercial agreement. A large number of people browse the web to purchase golf-related travel and merchandise, for example. A series of prompts assuming the user 12 is interested in golf and golf related subjects, sources, articles, etc. would be created. Knowing what an expert and other people interested in golf selected helps the Smart Search system 10 application to seek sources, deal with expiry dates, and other items that would improve the match of items in the returned search elements presentation. Knowing the age and relative sophistication of the user 12 helps determine tools used to display and manipulate items returned from the search.

Dealing with temporal characteristics of elements can be approached on a community basis. By looking at the nature of the source, and the dates, and the COI, Smart Search system 10 will determine if an element is currently relevant. For archival interests, the dates would be used for different purposes such as to assist in navigating through volumes of material.

Search results may be presented to the user and the user may decide the results are not precisely what was sought. The user has changed the requirements in some way based on something learned from the first search results. The new search is not quite a new search, but a continuation of an existing search. This may be accomplished in a number of ways. In one example, the search can be modified by changing the choices of sources, or other attributes filtered by the policy representing the Community of Interest. These attributes, represented in the profile database, may be displayed to the user so some or all of them may be adjusted to more closely satisfy the search needs in the given instance.

Some search results may be out of line. One case when this might happen is when a person is doing a search for someone else. The search application may learn something inaccurate about the user. One feature of the search application would allow for the user to view the characteristics the search application has associated with him or her. For example, a window may be opened to show the COI's the user is a member of, and details of the COI's including age, education, geography, membership in clubs, etc. If the attributes are inaccurate, they may be changed or deleted.

Another means for altering the direction of the search application is to add clarification by looking at the data represented in the results. By selecting other features of the data to display relationships not clearly illustrated in the first display of the data, a search result may reveal new information to the user. The results data is representing the view from a particular point of view or COI. The user is not limited to this presentation of the data. Other features identified in the search are available and may be selected from a window, or by another means of manipulating the data of the results. A helpful device would be a window that lists all the recognized significant data relationships in the search results. For example, if 20% of the search results were from technical journals, and 15% of the search results were from items dating within the past ten years, those facts would be listed in the window for the user to see. The data itself reveals this information, using the database stored in the search application server to verify sources, publication dates, subjects and relevance, etc. Attributes about the users of the source are also relevant to the COI. If a description of the users of a source is made available, then the COI can be matched more directly with the targeted market of the sources. Even if the results are displayed by categories assumed to be important to the COI, there may be a feature in the data that is of interest to the user and is not graphically represented. By using a method such as the window mentioned above, a user may identify a feature that is of interest, and request that the display be modified to illustrate that feature.

Example:
Theater Directions Magazine
Monthly
20,000 Circulation US
Published in English
Specialized periodical for Theater professionals
Ages of readers
Demographics of readers
Additional information about readers
35 Articles monthly
Information about Authors
200 Advertisers
Information about advertisers
Personals
Classifieds
Etc.
Search User:
Member of a COI of Thespians
Search Application:
Prefers Theater Directions Magazine as a source for search conducted by a member of the Thespian COI.

A search may result in a listing of results spanning 3 major unrelated COI's. For example, a search on Home Networking may result in thousands of items in a list spanning many pages of titles. When looking at the results, they may fall into the categories of: home communications network architectures including such subjects as computer LAN's, etc., home health aides visiting the ill or elderly, and home school programs using a network of teachers and other resources. By using the strategy associated with Communities of Interest, the system would identify which major subject area was related to a particular COI through: knowledge of the sources of materials, subject handled by the source, types of authors, types of content, disambiguating words used for the search and filtering for features related to the COI, etc. Without specific knowledge of the COI, the total of the search results would be segregated based upon strata and subject as defined in the global COI database. The results would then be displayed showing the features that differentiate them, in this case being home electronics/communications, social work, education, and other.

Having thus described the invention, the advantages of its implementation are apparent. For example, one of the most important applications of the web is to enable people to purchase items they want in a convenient way. The process of shopping consists of a number of steps, some made easy by the web, others which are confusing or inconclusive on the web in its current form. A number of search engines are already available on the web. However, there are some problems with search engines that can make the shopping experience difficult. It is an object of the present invention to create an E-commerce specific web search application to facilitate and mitigate the problems encountered by users when they attempt to purchase things over the web. Therefore the present invention would constrain the problem, define the users, and implement the above described features to accomplish the given task.

There are two major population groups to consider who purchase items on the web: consumers and business-to-business. This includes traditional transactions, resource management issues such as inventory, and fulfillment. In addition, there are traditional web users with their own PCs as well as non-traditional web shopping experiences such as kiosks, in-store intranet and web shopping, and alternate device shopping such as web cell phone access.

Humans are particularly good at identifying patterns in data when the data is presented in an appropriate graphical form. The key is to identify reasonable graphical representations for abstract data elements. It is another object of the present invention to identify subject matter and object classifications that will be modeled graphically so search results may be presented to the user 12. An example for representing solutions graphically would involve using a metaphor for placing pushpins representing search returned objects at a high level and with relationships described graphically (between the returned objects). Color can be used to indicate proximity characteristics. Sound can be used to illustrate relationships among items, and to represent navigational distances between objects. Sounds can enhance an application so audio-based interfaces may be used in addition to graphical. For example, a search might be conducted using a cell phone, and the user 12 will listen to results receiving audio cues to help formulate relationships among returned items. For example, suppose a consumer is searching for a particular car. The consumer knows some attributes relating to the car, such as the manufacturer and the year. The Smart Search will enable the consumer user 12 to use a configuration management approach to filling in a form through which the search will be formulated. The assumption here is that the consumer's shopping interests can vary along a continuum from a very directed search through to a rather unconstrained browsing type of search. An important issue relating to these dimensions of searching is the ability for a search engine to have varying degrees of information presented during the query and still return useful, targeted, and understandable results.

If one considers all the possible pieces a consumer may know about his or her interests and preferences when selecting a car, one can imagine how a configuration management approach would be most suited to resolving the search problem for a consumer user 12. The consumer may be at the very early phases of a search and may require information about cars at a high level including, but not limited to: Consumer Reports, manufacturers' specifications, consumer endorsements and availability. He or she may be further along in the search and may already know which car he or she wants to purchase and now require financial information.

Another important feature for a search engine is the ability to store configured search criteria and re-submit it when more information is known, or to remove some attribute and submit the query again. Additional information relating to a search can come in forms generated from the original search or from modifications of the consumers requirements. The search is a configuration management problem up to and including the purchase and associated transactions associated with the purchase.

Displaying results is the most important graphical element addressed by the present invention. A search is only as effective as the consumer user's ability to understand and relate to the results that have been returned from the server 18. In this case, it would be preferred to arrange the objects returned in a different graphical presentation than traditional search engines. Graphical models will be used that display representative illustrations of all the returned objects so the consumer can get a "bird'seye view" of all possible solutions to the query, and their respective relationships to the search criteria, and to each other. The graphical presentation will also indicate the nature of the objects that have been returned. For example, all newspaper articles may be colored a particular shade of blue, and may be arranged in segmented blocks from most recent to oldest. Also, the articles may have priorities ranging from "search subject in title and body" to "references of search subject in body." Since the nature of the source of an article is known, database elements can be created that describe the relationships between a particular journal and the subject being searched. In other words, an index can be created that describes the relationships between sources, objects, and known consumer search queries. Words and relationships can be added to the index database as users submit queries.

To display the results as mentioned above will require graphic models that best display data with multiple relevant attributes. The consumer user 12 should be able to select a column heading corresponding to the attributes and rearrange the results based upon his or her preference. For example, the user 12 may choose to display the journal articles in order from technical journals, then from newspapers, then from business magazines.

One can envision a system that looks similar to a Netscape email browser where date, subject, or author may be used to sort the elements in the mailbox. The graphical interface gives the user a perspective that includes an understanding of the scope of the results, and also access to multiple means of navigating through the results as well as a method of manipulating the order of the results so visual scanning can be made more effective.

The consumer may also wish to know how many of the results of the search are primary sources, and how many are duplicates of the same content or provider. The graphical display should provide a perspective to the consumer about how many unique hits the search has returned by evaluating certain attributes of the results. For example, journal, date, length of article, word comparisons on search results, URLs, etc. These relationships will be defined in the index database 42 and will be expanded on an ongoing basis to include more subjects, resources, sources, and other attributes.

One of the most daunting concepts to face a consumer using a medium such as the Internet is to understand deterministically, all that is available to him or her over the medium. When looking at TV Guide, one can get a sense of what's out there that can be accessed on television. When a user 12 is searching for something on the Internet, that user can only imagine that he or she has seen all there is to see out there. By presenting a "bird's-eye view" the present invention will assist the consumer in understanding many of the resources on the web that are available. In addition, alternate resources can be presented that may require subscription so information providers can promote their products.

It is to be appreciated that the present invention may be implemented in a variety of different software and hardware environments. Preferably, the system of the present invention is a distributed system wherein control of the processes described (and the underlying code) reside at appropriate locations in the system depending on resource allocation and presence/absence of information, functions, or memory storage. For example, the front-end server may accommodate the GUI processes and control while the back-end may accommodate the database retrieval functions. Upon a reading of this disclosure of the present invention, implementation of the necessary and unique software and hardware components and implementation of any modifications of known techniques and components should be apparent to those versed in the art, depending, of course, on the specific environment in which the present invention is applied.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, we hereby claim:

1. A method for information searching comprising:
   determining at least one of interests and preferences for a user conducting an information search;
   conducting the information search;
   evaluating results of the search based on at least one of the interests and preferences;
   learning at least one of new interests and new preferences for the user based on the evaluating;
   manipulating the results based on the evaluating including:
      determining if the search returned in excess of a predetermined large number of results; and,
      clustering the results into feature groups based on results of the determining; and, summarizing the results into a display entity with dynamic attributes based on the manipulating.

2. The method as set forth in claim 1 further comprising:
   representing interest categories and representing each differently for different interests;
   representing relationships among the categories; and,
   identifying an individual and the interest categories to which he or she belongs.

3. The method as set forth in claim 1 further comprising identifying shifting and dynamic elements over time including, but not limited to resources, sources, access, individual's experiences and skill set, age, and preferences.

4. The method as set forth in claim 1 further comprising creating, updating and accessing personality profile records in a personality profile catalogue.

5. The method as set forth in claim 1 further comprising creating, updating and accessing expert records in an Expert Knowledge Database.

6. The method as set forth in claim 1 further comprising creating, updating and accessing source characterization records in a Source Characterization Database.

7. The method as set forth in claim 1 further comprising creating, updating and accessing community of interest records in a Community of Interest Database.

8. The method as set forth in claim 1 further comprising creating, updating and accessing display techniques records in a Display Techniques Database.

9. The method set forth in claim 1 further comprising creating, updating and accessing information records in an Information Database.

10. The method as set forth in claim 1 further comprising iterating using configurable query techniques, using a lexical dictionary for disambiguation of query text.

11. A system adapted for information searching, the system comprising:
   a graphical user interface to facilitate communication between a user and the system; and search components operative to determine at least one of interests and preferences for a user conducting an information search, conduct the information searching, evaluate results of the search based on at least one of the interests and preferences, and manipulate the results based on the evaluating, including clustering the results into feature groups if the results exceed a predetermined number of results;
   a learning engine operative to learn at least one of new interests and new preferences based on the evaluated results; and,
   a display integrated into the interface to display search results based on the interest and preferences.

12. The system as set forth in claim 11 further comprising at least one database for storing information representing interest categories, representing relationships among the categories and identifying an individual and the interest categories to which he or she belongs.

13. The system as set forth in claim 11 wherein the search components include means for identifying shifting and dynamic elements over time including, but not limited to resources, sources, access, individual's experiences and skill set, age, and preferences.

14. The system as set forth in claim 11 further comprising a personality profile catalogue.

15. The system as set forth in claim 11 further comprising an Expert Knowledge Database.

16. The system as set forth in claim 11 further comprising a Source Characterization Database.

17. The system as set forth in claim 11 further comprising a Community of Interest Database for storing the interest categories.

18. The system as set forth in claim 11 further comprising a Display Techniques Database.

19. The system as set forth in claim 11 further comprising an Information Database.

20. The system as set forth in claim 11 wherein the interface facilitates communication of configurable query techniques, using a lexical dictionary for disambiguation of query text.

* * * * *